(12) United States Patent
Gregory

(10) Patent No.: US 10,458,727 B2
(45) Date of Patent: Oct. 29, 2019

(54) HEAT TRANSFER USING FLEXIBLE FLUID CONDUIT

(71) Applicant: Bruce Gregory, London (GB)

(72) Inventor: Bruce Gregory, London (GB)

( * ) Notice: Subject to any disclaimer, the term of this patent is extended or adjusted under 35 U.S.C. 154(b) by 552 days.

(21) Appl. No.: 14/083,129

(22) Filed: Nov. 18, 2013

(65) Prior Publication Data

US 2015/0136361 A1 May 21, 2015

(51) Int. Cl.
*F28F 13/00* (2006.01)
*F28F 21/06* (2006.01)
(Continued)

(52) U.S. Cl.
CPC .............. *F28F 13/00* (2013.01); *F24D 3/146* (2013.01); *F24D 3/148* (2013.01); *F24S 10/73* (2018.05); *F24S 10/755* (2018.05); *F24T 10/10* (2018.05); *F28D 1/0477* (2013.01); *F28F 1/122* (2013.01); *F28F 1/22* (2013.01); *F28F 1/36* (2013.01); *F28F 21/062* (2013.01); *F24S 2025/601* (2018.05); *F24S 2025/6004* (2018.05); *F28F 2013/005* (2013.01); *F28F 2255/02* (2013.01); *F28F 2275/025* (2013.01); *F28F 2275/08* (2013.01); *F28F 2275/12* (2013.01);
(Continued)

(58) Field of Classification Search
CPC ... F24D 3/12; F24D 3/14; F24D 3/143; F24D 3/144; F24D 3/145; F24D 3/146; F24D 3/147; F24D 3/148; F28D 9/0081; F28F 21/062; F28F 1/122; F28F 2275/025; F28F 2275/08; F28F 2255/02; F24J 2/243; F24J 2/268; F24J 2002/4676
See application file for complete search history.

(56) References Cited

U.S. PATENT DOCUMENTS 3,687,169 A * 8/1972 Reynard ................. F16L 11/16
138/134
5,042,569 A * 8/1991 Siegmund ............... F24D 3/143
165/49
(Continued)

FOREIGN PATENT DOCUMENTS

CN  201706080 U  1/2010
DE  102012001557 A1 * 8/2013 ............ E04F 15/102
(Continued)

OTHER PUBLICATIONS

PEX Information.pdf.*
(Continued)

*Primary Examiner* — Jianying C Atkisson
*Assistant Examiner* — Jose O Class-Quinones

(57) ABSTRACT

Heat transfer between a fluid-bearing flexible tube and a heat-conducting surface is improved by fixing a flexible heat-conducting sheath to the flexible tube and by compressive fixing that distorts the tube and deforms the sheath and/or the surface. The tube can be made of cross-linked polythene (PEX). The sheath can be spirally wound high-purity aluminum wire. The sheath enables efficient heat transfer between the outer surface of the tube and the heat-conducting surface. Applications include radiant heating and cooling. Tube layout can be customized and variable tube spacing is possible, for example by using a castellated layer to support the tube.

14 Claims, 9 Drawing Sheets

(51) Int. Cl.
  *F28D 1/047* (2006.01)
  *F28F 1/12* (2006.01)
  *F28F 1/22* (2006.01)
  *F28F 1/36* (2006.01)
  *F24D 3/14* (2006.01)
  *F24T 10/10* (2018.01)
  *F24S 10/75* (2018.01)
  *F24S 10/70* (2018.01)
  *F24S 25/60* (2018.01)

(52) U.S. Cl.
  CPC ........... *F28F 2275/20* (2013.01); *Y02B 30/24* (2013.01); *Y02E 10/12* (2013.01); *Y02E 10/44* (2013.01); *Y10T 29/49826* (2015.01)

(56) References Cited

U.S. PATENT DOCUMENTS 6,533,185 B1   3/2003   Muir

2003/0188856 A1 * 10/2003 Pays ..................... F27D 1/12
                                                     165/172
2009/0101306 A1 *  4/2009 Reis ..................... F28F 13/00
                                                      165/56

FOREIGN PATENT DOCUMENTS

EP          0041653 A1 * 12/1981   ............... F24D 3/14
GB          2036237 A   *  6/1980  ............... F16L 11/12
WO     WO 2011139964 A1 * 11/2011  ............. F24D 3/141

OTHER PUBLICATIONS

Thermal Conductivity of Metals.pdf.*
DE-102012001557A1—English Machine Translation.*
EP-0041653A1—Machine English translation.*

* cited by examiner

HEAT TRANSFER USING FLEXIBLE FLUID CONDUIT

RELATED APPLICATIONS

This application references UK patent application GB1220800.5, filed 19 Nov. 2012.

FIELD OF INVENTION

Heat transfer including radiant heating and cooling applied to domestic and commercial living and working spaces and solar and geothermal heat exchange.

BACKGROUND

Aims

The aims of the present invention are to:
1. Improve the heat transfer performance of flexible conduit bearing a heat transfer fluid, without substantive reduction in the ability of the flexible conduit to be easily arranged manually in a customized heat transfer circuit, meaning a circuit with a pattern that can be varied, possibly with in situ adjustment, to meet a wide variety of heating or cooling needs.
2. Provide a heat transfer system for radiant heating or cooling or solar or geothermal heat exchange that combines high heat transfer efficiency, ease of customization and simplicity in manufacture, design, ordering, delivery, installation and maintenance.

PEX Tube and its Applications

Cross-linked high-density polythene (PEX tube) is a common example of a flexible fluid conduit, widely used to conduct hot and cold water. PEX tube is up to 6× cheaper per unit length than more traditional copper tube (2012 figures), is easily configured, has a long life, resists freezing damage and is highly resistant to corrosion.

PEX tube is also used in heat transfer applications, most often in hot-water under-floor heating. In heat transfer applications that permit use of standard heat-exchange assemblies, such assemblies will tend to be made of materials of high thermal conductivity: usually metals. For example, radiant heating or cooling panels that are suspended from ceilings are usually of standard dimensions and manufactured in, for example, steel. PEX has a thermal conductivity that is 800× lower than copper and 100× lower than carbon steel. This disadvantage can be outweighed by the ability of PEX tube to be readily configured in-situ, allowing the use of custom tube layouts.

Examples of Heat Transfer Applications of PEX Tube are:

Radiant heating or cooling systems in which a tube carrying a heat-transfer fluid is fixed in thermal contact with a large surface area that acts as a radiant emitter or receiver respectively. Using a flexible tube, such a system can be customized in situ to suit living spaces of differing geometries and with differing heating or cooling needs.

Solar heat collection systems in which a tube carrying a heat-transfer fluid is fixed in thermal contact with a heat-collecting surface. Using flexible tube, a solar thermal panel can be constructed in situ to fit the geometry of a roof.

Geothermal heating or cooling system in which a tube carrying a heat-transfer fluid is fixed in thermal contact with plates or fins that transfer heat from or to a body of water. Using a flexible tube, a curved tube layout can be fixed to heat-conducting surfaces supported by a snap-together frame: the in-situ assembly is sunk in a geothermal pond.

Geothermal heating or cooling system in which a tube carrying a fluid is fixed in thermal contact with plates or fins that transfer heat from or to the ground. Using a flexible tube, a curved tube layout fixed to heat-conducting surfaces can be placed in trenches that are laid out according to the available space.

Improving Heat Transfer Efficiency

The applications mentioned above all refer to space heating and cooling. This accounts for a significant fraction of national energy use. For example, in the US and the UK, residential and commercial space heating and cooling is estimated to consume around 20% and 25% of national energy respectively. Improving heat transfer efficiency in such applications is beneficial both in saving costs and in reducing carbon emissions.

Heat transfer efficiency is improved by reducing the overall resistance of the thermal path between the heat transfer fluid inside the tube and the medium with which heat is being exchanged. The effect of reducing thermal resistance is to:

Reduce the temperature drop for a given heat flux.
In the case of a heating system, allow a lower operating temperature of the heating medium.
In the case of a cooling system, allow a higher operating temperature of the cooling medium.

System-level aspects of heat transfer efficiency are discussed later.

In the applications mentioned above, the tube is fixed to a thermally conductive heat-diffusing or heat-collecting surface that is much larger than the surface are of the tube. Heat transfer efficiency is improved by:

Fixing the tube so that substantively 100% of the exterior surface of the tube is in intimate contact with the conductive surface.
Ensuring that the contact between the exterior surface of the tube and the conductive surface has no voids ie reducing thermal contact resistance.
Providing sufficiently extensive contact between the exterior surface of the tube and the conductive surface so that any voids are effectively bridged.

The first of these requirements can be met if heat exchange units are fully assembled before installation. For example, the tube can be sandwiched between shaped metal plates or embedded in a conductive layer such as graphite-loaded plaster.

Flexible tube configured in situ can also be embedded. For example, flexible tube used in under-floor heating is often embedded in a screed that is initially liquid and sets to a solid. Typically this screed is based on calcium silicate or calcium sulfate. These materials have the defect of poor thermal conductivity.

A widely used alternative is to fix the tube to heat-conducting plates, usually made of aluminum sheet, or to a rigid panel with an aluminum layer. The aluminum sheet is formed into channels. The rigid panel is routed or molded to form channels and an aluminum layer is attached either pre-formed into channels or the layer is pressed into the panel. The inner diameter of the channels matches the outer diameter of the tube and the tube is pressed into the channels. By using a channel with an omega-shaped cross-section, the tube is retained. But such a channel only provides direct thermal contact between the plate and around 55% of the external surface area of the tube.

The area of thermal contact can be increased by a further installation step in which a heat conducting strip is fixed to the plate, covering the channel and the tube within it. Such a strip can be applied to straight sections of tube in the channel, but is difficult to apply to curved sections of channel, especially if this curvature is variable. Such a strip would be especially difficult to apply to a coiled tube layout.

Thermal contact resistance between abutting surfaces is reduced when such surfaces mate exactly, are very smooth and are held together under pressure. These conditions are not met by the conventional arrangement of tube and channel: the requirement for a press-fit between tube and channel and normal variations in tube and channel diameter mean that there is an uneven interface between the outer surface of the tube and the conducting surface. A partial solution is to embed the tube in a heat conducting filler inside the channel and under the strip. Flexible silicone grout can be used. But silicone grout has thermal resistance, being typically over 60× less conductive than, for example, aluminum, and use of grout requires a further installation step, in which an exact amount of filler is placed in the channel or excess filler is scraped off and removed.

The steps required in this example demand a significant level of skill, the steps being:
Install the channel-bearing heat-conducting plates (for example, on an insulating layer on a subfloor).
Ensure the channels are clean, for example by blowing out debris.
Place a layer of thermal filler (liquid, gel or paste) inside the channels.
Press the flexible tube into the channels.
Place a layer of filler over the tube.
Fix a heat conducting flat strip over the channels and press down, removing excess filler.
Continue pressing down until the filler has set.

The present invention describes a modification of flexible tube that enables construction of a heat transfer system in which:
Thermal filler in a channel is not required.
A strip over the channel is not required.
At the same time, overall heat transfer performance is superior because:
Substantively 100% of the surface area of the tube is in contact with the heat collecting/diffusing surface.
Thermal contact resistance is low.
Full contact between tube and plate is maintained over tube sections of any curvature.

The present invention also describes how a modified flexible tube can be applied in a radiant heat transfer system that does not rely on channel-bearing plates or panels.

Prior Art: Tube with Improved Heat Transfer

In an example of the present invention, metal wire is used to improve the heat transfer performance of flexible tube. Metal wire is commonly embedded in flexible hose to prevent crushing and kinking. Helical wire used, not for heat transfer, but for reinforcement of a flexible tube dates to the 1600s. A relevant patent for pressure-resisting fire-fighting hose—UK patent no 263—was granted to John Lofting in 1690. Other examples are:

Mulconroy et al, U.S. Pat. No. 992,516; Sundh, U.S. Pat. No. 1,179,577; Onaka, U.S. Pat. No. 3,526,692; Lawless et al, U.S. Pat. No. 3,791,415; Stent, U.S. Pat. No. 3,938,939; Kanao, U.S. Pat. No. 4,140,154; Kovacs et al, U.S. Pat. No. 4,860,798.

Flexible polymeric hose reinforced with an embedded helix of high tensile steel wire is widely commercially available. Such hose is available in a variety of polymers, including PVC and natural and synthetic rubbers. The embedded wire is not well-suited to improved heat transfer through the wall of the hose since high tensile steel, although excellent for reinforcement, is a relatively poor thermal conductor, having, for example, around 16% of the conductivity of high purity aluminum. High purity aluminum, on the other hand, is not a good choice for reinforcement. Also, because the wire is embedded in the wall of the hose, it does not present a surface that can make direct contact to a heat-diffusing or heat-collecting surface of the kind that is required in a heat transfer system such as a system for radiant heating or cooling.

Hose with an exposed wire sheath—usually braided wire—is commonly used for mechanical protection and is also mentioned as means of preventing static build-up: for example: Kanao, US 2011/0247714.

Chiles (U.S. Pat. No. 4,779,673) describes a flexible, reinforced, multilayered hose that is embedded in concrete slab and conducts a heat transfer fluid. Applications include melting of snow, heating of buildings and transfer of solar heat. Both the inner and outer walls of the hose are made of polymer and the reinforcement is a layer of fabric braid. Improved heat transfer is claimed if the inner and/or outer layers incorporate thermally conductive fillers such as graphite or powdered metal. Typically, such filled polymers have feeble conductivity compared with continuous metal, having, for example, less than 2% of the conductivity of high purity aluminum. In the applications envisaged by Chiles, improved conductivity of the exterior hose wall would have little overall effect since the concrete slab would provide the controlling thermal resistance.

Jinbo (CN 201706080) describes heat-conducting helical wire either partly or completely embedded in a polymer tube. The aim of this is to both reinforce the tube and to improve heat transfer. The effect on the flexibility of the tube is not discussed. The partly embedded wire presents a highly conductive surface that can be brought into direct contact with a heat-diffusing or heat-collecting surface. The fully embedded wire does not have this property and is of less interest and, in any case, resembles known prior art.

In general, embedding of wire in a smooth-walled tube leads to reduced flexibility, affecting the ability to customize the layout of the tube. The effect on flexibility depends on the material of the wire and of the tube, the dimensions of the wire and of the tube, and the density of turns of the wire ie the % coverage by the wire of the area of the tube wall.

The most common relevant tube material is PEX and Jinbo refers to wire that is aluminum or copper. The modulus of elasticity of these metals is 80-150× the modulus of elasticity of HDPE, so that if we consider a layer of PEX with embedded wire, any stretching or compression in that layer will be concentrated in the PEX between the wire. As the density of turns increases, heat transfer performance improves because (a) a greater area of polymer tube wall is in intimate contact with a conductive surface, (b) a greater area of this conductive surface can itself (in relevant heat exchange applications) be in contact with a heat-diffusing or heat-collecting surface, and (c) overall contact resistance in the case of (b) is reduced because the turns provide bridges across areas of poor contact. But, at the same time, as the density of turns increases, the area of polymer between embedded turns shrinks, reducing the area available to stretch or contract when the tube is bent. As a result, the tube becomes stiffer. For example, if the surface area of tube wall covered by embedded wire rises to 50%, then the tube becomes approximately twice as stiff. As the density of turns is increased, custom layout becomes impractical.

In general, embedding of helical wire in smooth-walled tube requires the thickness of the tube wall to be increased and this also results in greater stiffness of the tube. It is obvious that a sufficiently fine wire will not require a significantly thicker tube wall. However, the finer the wire, the less effective it is as an agent for improved heat transfer. In the case of a standard size of PEX tube, the total outer diameter is 16 mm and the overall thickness of the wall is 2 mm. The wall comprises layers from the inside to the outside: PEX 1 mm, adhesive 0.1 mm, aluminum 0.2 mm, adhesive 0.1 mm, PEX 0.6 mm. If, to provide effective improvement in heat transfer, the desired diameter of embedded aluminum wire is 1 mm, then an additional thickness of wall is required to avoid compromising the integrity of the structure of the tube. If the wire is fully or partly embedded, this additional thickness is around 1 mm and 0.5 mm respectively, representing 50% and 25% increase in wall thickness.

In summary, if helical heat-conducting wire is embedded in flexible smooth-walled polymer tube, the tube becomes stiffer and less easy to configure in a custom layout. If very fine wire is embedded at a low density of turns, the effect on tube stiffness is small, but improvement in heat transfer is also small. If the wire is made thicker and the density of turns is increased, heat transfer improves but the tube with embedded wire becomes stiffer and eventually cannot be used in a custom layout.

In the present invention, this problem is solved.

Efficient Radiant Heat Transfer Systems

Hydronic (water-based) radiant heat transfer systems using PEX tube are increasingly used to heat and cool living and working spaces. The efficiency of such systems increases as the operating temperature falls (for a heating system) or rises (for a cooling system).

Heating efficiency rises with lower operating temperatures because:
- If the heat source is a boiler, lower water return temperatures enable better heat recovery from combustion gases, with an efficiency gain as much as 25%.
- If the heat source includes geothermal energy, the COP (coefficient of performance) of a heat pump increases by around 3% for every 1° C. drop in the temperature of the pump outlet.
- If direct solar heating is used, lower return temperatures in the heat-transfer medium enable a flat plate solar collector to be used rather then a more expensive evacuated tube collector. At low return temperatures, a flat collector is significantly more efficient than the evacuated tube. As the return temperature rises above the ambient temperature, a flat collector radiates heat back into its surroundings faster than an evacuated tube. When the temperature difference (between return temperature and ambient temperature) exceeds around 40° C., the efficiency of the flat plate falls below the efficiency of the evacuated tube. In a representative design of flat plate solar thermal collector, over the normal range of operation, each 1° C. reduction in operating temperature results in around 1% improvement in collector efficiency.

Lower operating temperatures are intrinsic in under-floor heating systems compared with other heating systems because under-floor systems deliver a near-optimum vertical temperature profile (warm feet and cool head). This profile enables greater comfort at lower temperatures.

Lower operating temperatures are achievable in any hydronic radiant heating system and higher operating temperatures are achievable in any radiant cooling system by means of:
- A larger radiant surface. A larger surface can transfer heat at a given rate at a lower radiant surface temperature.
- A more uniform radiant surface temperature. The surface temperature is made more uniform by reducing the thermal resistance of a layer on the thermal path in the plane of the radiant surface: the heat-diffusing layer (or in a cooling system, the heat-collecting layer).
- Lower thermal resistance through the entire thermal path between heat source and radiant-emitting surface (for a heating system) or between a heat sink and a radiant collecting surface (for a cooling system). This enables heat to be transferred at a given rate at a lower temperature of heating medium for a given surface temperature.
- Lower thermal mass and faster, zoned controls. This enables the system to respond more rapidly to local changes in required heating (or cooling) load, avoiding periods of unnecessary heating (or cooling).

In addition, the ideal space-heating or space-cooling system:
- Is cheap to manufacture, install and maintain.
- Is easily adapted to different physical layouts and to different heating or cooling loads.
- Is unobtrusive.
- Provides a high level of comfort.

Current Practice in Radiant Heating

Historically, hydronic space-heating in Europe has used wall radiators. Such radiators heat mainly by convection, resulting in currents of warm air moving to the ceiling. This is the opposite of the temperature profile that is ideal for comfort. Wall radiators have limited radiant area and have to be run at higher temperatures, meaning lower system efficiency. Typical wall radiator systems require circulating water temperatures around 60-75° C. Operating temperatures for a typical under-floor radiant system are around 30-35° C. The aesthetics of wall radiators are generally poor: wall radiators are obtrusive and impede the arrangement of furniture.

The defects of wall radiators can be remedied by under-floor radiant heating. The temperature distribution through the living space is almost ideal for comfort. The entire floor becomes the radiating surface so that the system can run at lower temperatures. The system is invisible and the arrangement of furniture is not impeded.

Hydronic under-floor heating has been widely adopted in Europe. For example, in Germany around 75% of new build homes use this form of heating. In the UK, hydronic underfloor heating is only 5% of the domestic heating market but is growing rapidly.

In the USA, space-heating has been strongly influenced by the wide use of air-conditioning. Fans and ducts installed for air-conditioning can also be used for air-heating. As a result, forced-air heating is used in around 70% of US homes, usually with a gas furnace as heat source. The forced air system is relatively cheap in newly-built structures, provides a fast response and the visual aesthetics are acceptable. The main defect is poor comfort: the temperature distribution is uneven. There is also noise and the potential spread of allergens. Zone control is less effective. Compared with radiant hydronic systems, energy efficiency is reduced by heat losses in the ducts, by the need to use higher operating temperatures to compensate for poor temperature distribution and the lack of fine zone control. If a renewable heat source is used, this requires a liquid/gas heat exchanger and efficiency is reduced by thermal resistance on the gas side.

PEX tube is used in under-floor radiant heating by fixing the tube in a serpentine or coiled layout in the plane of the floor. A number of different methods are used:

Attaching the tube to conductive heat-diffusing plates (usually aluminum) that are fixed between joists under a subfloor. The underside of the plates is insulated. This is a retrofit method. The large thermal resistance above the plates makes this method inefficient.

Fixing the tube above an insulating layer over the subfloor and burying the tube in a screed. The tube is fixed using channels in the insulating layer or using clips or using an embossed insulator (a castellated insulator) in which the tube can be pressed and held between protrusions. The screed acts as the heat-diffuser. This method is commonly used, but it is inefficient because the screed is a poor conductor and also has thermal mass. If screed is used above the ground floor, the building structure must have sufficient strength to bear the added load. Maintenance may require the solid screed to be hacked out with a jackhammer.

Fixing the tube inside an insulating layer over the subfloor. This is quicker than using screed and avoids the thermal mass of screed but upwards heat transfer is still poor.

Fixing the tube inside a conductive heat-diffuser mounted on an insulator over the subfloor. In one version of this solution, the heat-diffuser and the subfloor are combined. This solution provides a desirable combination of uniform heat, low thermal resistance and low thermal mass. The tube is fixed into channels in the heat-diffuser. The channels have an omega-shaped cross-section so that the tube is retained.

The last-mentioned solution is still defective:

The thermal resistance between hot water and heat-diffuser is significant: only around 55% of the tube is in contact with the spreader.

The mechanical contact between tube and heat-diffuser is uneven, resulting in significant thermal contact resistance.

The heat-diffuser is typically a standard thickness so that it is over-sized for high heat loads and under-sized for low heat loads. Heat loads will vary from room to room, for example, with higher heat loads in high-ceiling rooms with many windows and lower loads in interior corridors.

The channel-bearing panels used are typically a standard size, providing fixed spacing between tube runs. This means that the heat flow rate per unit area does not vary across a room, except as a result of falling water temperature as heat is given up. Yet some parts of a room have a higher heat demand than others. For example, closer tube spacing may be needed under a large window or under a high ceiling or may be desired in a bathroom. Wider tube spacing may be sufficient close to an interior wall.

The channel system requires panels with straight and curved channels to be laid side by side so that the tube runs in a continuous serpentine from a manifold and back to a manifold. The right number of each kind of panel must be computed and ordered. The need for exact customised design puts up the cost of such a system both in design and logistics.

In many channel systems, heat-diffusing plates are available only for the straight portions of the tube layout. By avoiding curved channels in the heat-diffuser, manufacturing is simplified. However, the radiant area is reduced.

Where the heat-diffuser and subfloor are combined, the heat leakage downwards is significant because standard subfloor material (for example, oriented strand board) is not a very effective insulator: the thermal conductivity of engineered wood is typically 4 to 5× the thermal conductivity of foam polymer.

The present invention offers a solution to these defects.

Prior Art: Radiant System

Specific examples of prior art follow.

Becker (U.S. Pat. No. 2,799,481) describes extruded metal floor panels with integral upward-facing channels of U-shaped cross-section in which heating pipe is laid. Metal strips fit over the channels. This design does not accommodate the curved sections of the tube and does not accommodate variation in tube spacing. There is significant contact resistance between tube and strip and between strip and panel.

(U-shaped channels with a slightly curved lip are also called here omega-shaped channels, or, sometimes in the patent literature, C-shaped channels).

Jacobsen (EP 0094953) describes floor panels that combine a load-bearing function with a heating function. The panels comprise a lower load-bearing layer, a middle insulating layer and an upper heat-diffusing metal layer. Upward-facing channels in the panels with a U-shaped cross-section hold tubes carrying a heat transfer fluid. This design is deficient as follows: (a) only around 50% of the surface are of the heating tube is in contact with the heat-diffusing surface, (b) only straight troughs are used, so that curved sections of tube are not in contact with the heat-diffusing surface, (c) the radiant system must be custom designed exactly in advance of construction and the components must be delivered accurately. In practice, errors are made and decisions changed, incurring cost and delay, (d) to avoid complexity, the panels must be restricted to a limited range of sizes so that variation in heating needs cannot be matched by variation in tube spacing.

Bourne (U.S. Pat. No. 4,782,889) describes a radiant floor heating system comprising a metal deck placed over the floor joists. Attached to the underside of the deck are metal troughs with a U-shaped cross-section. The deck and troughs support the structural load. Heat transfer tubing is snapped into the troughs to form a heating circuit. (To allow easy customization of the tube layout, the tube has to be flexible ie polymeric). Heat is diffused through the deck. The same comments apply as for Jacobsen above.

Pickard (U.S. Pat. No. 5,454,428) describes a radiant heating panel comprising an extruded aluminum plate with an integral channel of U-shaped cross-section into which flexible heating tube can be snapped. An array of plates is arranged so that the heating tube forms a circuit and the plates are supported on wooden sleepers on a subfloor with the channels facing downwards into gaps between adjacent sleepers. The comments made above re Jacobsen also apply here.

Grant (U.S. Pat. No. 5,743,330) describes a similar extruded aluminum plate and the same comments apply.

Fitzemeyer (U.S. Pat. No. 6,283,382) describes a similar extruded aluminum plate that can include a heat-conducting cap over the groove. However, there will be significant contact resistance between tube and cap and between cap and plate. This problem is only partly solved by using thermal grout in the channel.

Fiedrich (U.S. Pat. No. 5,579,996) describes a heat-diffusing plate that carries a heating tube in a channel with a U-shaped cross-section. The plate is supported by an insulating panel so that the channel faces upwards. Thermal contact between channel and tube is improved by embedding the tube in a thermal grout. The same comments apply.

Other similar radiant heat transfer systems are described by, for example:

Fennesz U.S. Pat. No. 4,646,814; Shiroki U.S. Pat. No. 4,865,120; Bilotta, U.S. Pat. No. 5,743,330; Alsberg U.S. Pat. No. 5,788,152; Muir, U.S. Pat. No. 6,533,185; Sokolean U.S. Pat. No. 6,910,526; Kayhart, U.S. Pat. No. 7,832,159; Stimson U.S. Pat. No. 7,939,747; Fiedrich US 2004/0026525; Newberry US 2008/0264602; Andersson US 2009/0314848; Ross US 2011/0052160;

In all the instances given above, heat transfer would be significantly improved by inserting into the U-shaped (or omega-shaped) channels the flexible tube with improved heat transfer, as described in the present invention.

Prior Art: Castellated Panels

Castellated panels allow a heating circuit to be laid out in any desired configuration. Such panels are routinely used to lay out flexible hydronic heating tubing on subfloor, prior to covering with screed. Typically, the panel not only holds the tubing but also has an insulating and load-bearing function.

Feist (U.S. Pat. No. 4,250,674) describes an array of interlocking castellated panels that holds flexible heating tube in any desired curved pattern. Heat-diffusing metal plates are fastened by screws to the tops of the castellations. However there is no direct contact between the heating tube and the metal plate so that heat transfer is poor.

Hagemann et al (U.S. Pat. No. 4,640,067) describe a castellated mat for under floor heating comprising a layer of insulation, covered by an abrasion-proof layer that is molded into a regular array of protrusions between which heating tube can be held. Once the tubing has been arranged in circuit, screed is poured over the assembly. This method provides poor heat transfer due to the low thermal conductivity of the screed and also causes inefficient heating control due to the thermal mass of the screed.

Fawcett et al (U.S. Pat. No. D541,396) and Stephan (U.S. Pat. No. D587,358) describe typical geometries for a molded castellated panel.

Adelman (U.S. Pat. No. 8,288,689) describes a castellated panel that has the additional feature of a thermally conductive layer covering the upper surface of the panel, so avoiding the need for screed. However, it would be difficult and expensive to shape metal sheet into the form of a castellated panel. Steel is sufficiently ductile to be pressed into complex curves but is a relatively poor conductor of heat. Aluminum, by contrast, is an excellent conductor of heat but insufficiently ductile. Adelman proposes that a metallic layer be applied to the panel surface by spraying or plating. However, such a layer would be too thin to be an effective heat diffuser. A critical deficiency is that the contact between heating tube and heat-diffusing surface is limited to significantly less than 50% of the surface area of the tube.

Backman (U.S. Pat. No. 8,020,783) describes a castellated panel that has the additional feature of a heat-diffusing panel that fits into guides in the castellated panel and is attached by screws to the castellations. Again the contact between heating tube and heat-diffusing surface is limited.

In an example, the present invention employs a castellated panel to enable freedom of tube layout and to simplify the process of designing, ordering, delivering and installing the radiant system, and, at the same time, solves the problem of poor heat transfer that arises in the instances described above.

Before fully describing the present invention, it is helpful to define what is meant by flexible tube.

Flexible and Elastic Tube

PEX tube is an instance of a class of flexible and elastic tubes of relatively low thermal conductivity that can be used to conduct a heat transfer fluid. The flexibility and elasticity of such tube allows it to be easily arranged in a tightly curved layout by manual methods, where such a layout can be, for example:

A flat meander or serpentine

A raised meander, for example, a meander on a cylindrical surface

A flat coil or spiral

A raised coil or helix.

The flexibility of tubes can be defined by the bending radius (BR), meaning the minimum possible radius of the bent tube expressed as a multiple of the outer diameter of the tube. By definition, if the tube is bent to a radius smaller than the minimum, then the tube kinks. In general, BR depends on:

The extensibility and compressibility of the material of the tube.

The temperature of the material at the time of bending. For example, the bending radius of PEX is increased by a factor of over 2× if the temperature is reduced from 20 to 0° C. If the temperature is raised to 130° C., this is the softening temperature of PEX and the bend radius is greatly reduced.

The method of bending (incorporating sand or ball bearings or a snugly-fitting spring into the tube inhibits kinking).

Duration of bending.

The profile of the wall of the tube (smooth v corrugated)

The thickness of the wall of the tube.

Reinforcement of the tube, for example by a metal helix or by braiding.

In a typical domestic space heating application, using hot water conducted through a flat serpentine tube, the standard spacing of adjacent turns of the tube requires that BR=15 (approximately).

For soft copper in typical plumbing diameters, BR=3 to 4 so that copper can be configured in a suitable serpentine. However, copper is relatively stiff: having a modulus of elasticity of 105-120 GPa: this is 50-100× the modulus of elasticity of common polymers. As a result of its low elasticity, copper requires special bending equipment: creation of an extensive custom curved layout in situ is impractical.

The present invention concerns relatively elastic tube, where this can be defined as having a modulus of elasticity less than 2 GPa. Examples of modulus of elasticity are:

Rubber: 0.01-0.1 GPa

Low density polythene: 0.24 GPa

Polyurethane: 0.1-0.7 GPa

Polypropylene: 1.5 GPa

Nylon 6: 1.8 GPa

The present invention also concerns flexible and elastic tube that has low thermal conductivity where this is defined to be less than 2 W/m° C. Most common polymers have a thermal conductivity less than 1 W/m° C. For example, the thermal conductivity of PEX is around 0.45 W/m° C.

As an example, for PEX tube at 20° C., BR=6 and the modulus of elasticity of high-density polythene is around 0.8 GPa, so that the flat serpentine required for domestic space heating is easily achieved without special bending equipment. In cold conditions, the tube may need to be heated, for example, by using a hot-air blower. The temperature range of PEX is −100° C. to +110° C., making PEX suitable for a variety of heating and cooling applications.

As an example, for rigid poly vinyl chloride (PVC) tube at room temperature, BR exceeds 250 and the modulus of elasticity is around 3.2 Gpa. If the tube is warmed to around 40° C., BR is reduced to about 10 and elasticity is greatly increased. Therefore, by warming the PVC tube using simple methods (such as interior electrical heating), it is possible to construct a useful curved layout. The temperature range is 0 to 60° C. This narrow range limits the utility of rigid PVC in heat transfer applications. Chlorinated PVC has a wider range: from −40° C. to +90° C.

PVC can be made highly flexible by adding plasticizer. In an example, flexible PVC is extruded round a steel helix. In this configuration, BR=2 to 3, allowing a useful curved layout to be constructed. By using an inner liner of polyurethane, this kind of tube may be used for heating or cooling of consumable liquids. The temperature range is −20° C. to +90° C.

Flexible and elastic tube can also be constructed from a steel helix bonded to fiber-glass cloth with neoprene inner and outer layers. This tube has a temperature range of −50° C. to +150° C. Similar tube using silicone rubber inner and outer layers has a temperature range of −85° C. to +310° C. For both kinds of tube, BR=0.5.

There are many possible combinations of reinforcing helix and polymer, providing tubes that are flexible, elastic and able to serve over temperature and pressure ranges useful in heat transfer systems. Likewise, there are many possible combinations of reinforcing braid and polymer, providing tubes that can be used in heat transfer applications. Typical values of BR are in the range 2 to 10. For example:

PVC reinforced with nylon braid.
Silicone rubber reinforced with fiber-glass braid.
Neoprene reinforced with steel wire braid.
Polyurethane reinforced with polyester braid.
Nylon reinforced with steel wire braid.

PEX tube may have multiple layers. For example, the layers in Al-PEX are in sequence from the inside of the tube: PEX, bonding agent, aluminum, bonding agent, PEX.

The aluminum layer prevents diffusion of oxygen through the walls of the tube. Typically the aluminum layer is created by folding a strip of metal round the inner PEX tube and by butt-welding this strip. A typical PEX tube of 16 mm OD has an aluminum layer of 0.2 mm inside a wall that is 2.5 mm thick. The aluminum is a ductile and malleable alloy that allows bending of the tube. Although the aluminum layer makes the tube stiffer than a tube made entirely of HDPE, it is still easy to create a desired curved layout manually. The preferred aluminum alloy is 3003 HO: low temper, high-purity aluminum (around 97% pure) with a small amount of manganese (1-1.5%) added. This alloy has a maximum elongation of around 20%, allowing a value of BR=5.

SUMMARY DESCRIPTION

A flexible tube of low thermal conductivity (less than 2 W/m° C.) has fixed to it a flexible outer sheath of high thermal conductivity (greater than 15 W/m° C.). In an example, the tube can be PEX and the sheath can be spirally wound high-purity aluminum wire. The wire is tightly wound round the tube using a wire that is under greater than 0.5 kg tension. The wire is fixed to the tube by a thin layer of flexible bonding material. The bonding material is sufficiently flexible and elastic that the flexibility of the sheathed tube is not significantly less than the flexibility of the unsheathed tube. The bonding material holds the wire at a uniform spacing that enables the sheathed tube to be easily flexed and permits the sheathed tube to be cut without the wire unravelling. In an example, the flexible bonding material is a silicone compound, which has a modulus of elasticity that is typically less than 5% of the modulus of elasticity of PEX.

The sheathed tube is fixed in compressive contact with a heat-diffusing or heat-collecting surface, whereby the sheath provides a highly conductive thermal path between that surface and substantively all the outer surface of the tube.

The sheath can be formed of a soft material (for example, high-purity aluminum or graphite compound): under pressure, this material deforms against the diffusing or collecting surface and reduces the thermal contact resistance. A suitable compression of the sheathed tube against the conducting surface is sufficient to cause a deformation equivalent to a change in the radius of the sheathed tube of at least 0.5%. The diffusing or collecting surface can have a deformable layer that deforms against the sheath.

The flexible sheathed tube can be laid out in any desired pattern at any desired spacing: fixing the tube between an insulating layer fixed to the underlying structure (for example, a subfloor, a wall, a ceiling or a roof) and a rigid heat-conducting layer. In an example, the insulating layer can be made of highly insulating rigid polymer foam such as dense polyurethane foam. In an example, the conducting layer can be an aluminum plate. The tube can be laid out by weaving between castellations molded in the insulating layer or attached to the insulating layer, or by attaching the tube to the insulating layer using clips or adhesive.

Advantages

This solution applied to radiant heating or cooling offers the following advantages:

The thermal resistance between the heat transfer fluid in the flexible tube and the heat-conducting layer is reduced, allowing reduced operating temperatures and thereby improved overall energy efficiency.

Tube spacing can be varied, enabling local heat output to match local heating needs.

The heat diffusing/collecting layer can be of different thicknesses in different locations, enabling reduced overall material cost.

The thermal resistance between tube and underlying structure is high so that heat leakage is reduced.

The manufacturing requirements for this solution are simple:

Suitable PEX tube is widely available and made by several manufacturers.

Sheathing the tube: spiral wire winding machinery is readily available

Molding the insulating layer: molded foam polymer is available from many manufacturers.

Manufacturing the rigid conducting layer. Suitable aluminum and graphite sheet is available from multiple sources. In an example, 6000 series aluminum alloy sheet can be cut into standard panels.

Enabling compression of tube under the conducting layer. A peel-off adhesive layer can be placed on the tops of the castellations. Holes can be drilled in the panels to accommodate bolts. Corresponding sockets can be embedded in the castellations or the insulating layer.

The design and logistics requirements of this solution applied, for example, to under-floor heating, are also simple:

The area of the floor to be heated is measured.

The location of the tube manifolds is decided.

The design heat load per room is estimated based on room position and function, window area, insulation factors and climate. Software is available to do this.

The total area of the required insulating layer is the same as the area of floor.

The area of conducting layer required for each room is the same as the area of floor.

The thickness of conducting layer required for each room is estimated from the design heat load.

The length of tube required for each room is estimated from the design heat load and manifold location.

Required local variations in tube spacing are noted.

The required layout diagrams can be produced automatically online and the required quantities of tube, insulating layer and conducting layer can be shipped to the user or sourced from a distribution chain.

Installation is easy:

The insulating layer is an array of standard panels that are trimmed as required and are fixed to the underlying structure (in an example, the panels are fixed to a subfloor using adhesive and/or screws or nails).

The sheathed tube is laid out on the insulating layer and fixed there (in an example, by weaving between castellations in the insulating layer).

The sheathed tube is cut to length and the tube ends are fixed to the manifolds using standard fittings.

The conducting layer is an array of standard panels that are trimmed as required and fixed over the tube (in an example by using bolts that engage with sockets fixed in the insulating layer and/or by pressing against contact adhesive on the flat tops of the castellations).

Tube, insulating layer and heat-spreading layer can all be cut and trimmed with simple tools.

Maintenance is also easy since it is easy to disassemble the system, for example, to trace and repair a leak. Disassembly is especially easy where bolts have been used to secure the conducting layer.

Instances of the Invention

Flexible Sheath

A flexible sheath covers the exterior surface of the flexible tube. The sheath has high thermal conductivity. High thermal conductivity is defined to be greater than 15 W/m° C. Suitable materials include:

Stainless steel (15-20 W/m° C.)

Carbon steel (40-50 W/m° C.)

Aluminum alloy (150-230 W/m° C.)

High purity aluminum (greater than 99% pure) (240 W/m° C.)

Copper (400 W/m° C.)

Graphite (in plane) (50-500 W/m° C.)

High conductivity improves heat transfer from heat transfer fluid to heat-conducting surface:

radially through the sheathed tube;

circumferentially through the sheath, enabling the sheath to bridge gaps in the contact between sheath and surface.

Based on the ratio of conductivity to cost, high purity aluminum is a preferred material for the sheath.

Preferably the combination of sheath plus tube is substantively as flexible as the tube alone. Examples of flexible conductive sheath are:

A spiral of conductive strip (wire or tape) that is wrapped round the tube. Uniform gaps between the turns of the spiral strip permit flexing of the tube. In order to accommodate a bending ratio of 5×, the apparently required uniform gap represents 20% of the length of the sheath. This assumes that the material of the spiral strip is incompressible. If the material used is soft (ie malleable, deformable), a much smaller gap is required. For example, using soft (ie high purity) aluminum 0.5 mm OD wire wound round standard 16 mm OD PEX tube, the required uniform gap is less than 5% of the length of the sheath ie the % coverage of the surface of the tube is greater than 95% without significantly impeding the flexibility of the tube.

In another example, the sheath is a series of rings. Uniform gaps between the rings permit flexing of the tube. The material of the rings or of the tape or wire can be graphite or metal.

A thin continuous layer of aluminum alloy of the kind already used as an inner layer in PEX tubing. This layer can be attached by welding or by electro-deposition. As this layer is made thicker, the heat transfer performance improves but the combination of tube and sheath becomes stiffer.

A flexible polymer containing particles or fibers that are thermally conductive or that have a thermally conductive coating. This layer can be continuously extruded around the inner fluid-bearing tube.

Preferably the sheath is made of soft deformable material. A sheath of deformable material, when pressed against a conducting surface, tends to conform with that surface, lowering the thermal contact resistance.

Suitable deformable materials include high purity aluminum, high purity copper and graphite.

Radiant Heat Transfer System

A radiant heat transfer system can be used for either heating or cooling. In the case of a heating system, the conducting surface is a heat diffuser. In the case of a cooling system, the conducting surface is a heat-collector. Radiant cooling systems require additional controls to prevent operation below the dew-point and/or should include provision for collecting and removing condensate.

The heat transfer medium in a hydropic system is water. Water may be combined with, for example, anti-freeze and corrosion inhibitor. Alternative heat transfer media can be used: for example, oil or synthetic media.

The same general design can be used for a radiant heat transfer system that is fixed in the floor, or in the wall or in the ceiling or suspended from the ceiling or fixed on a roof or similar exterior structure.

The components of such a system are:

A rigid substrate that is fixed to the underlying structure.

An insulating layer that is fixed to the rigid substrate (or these two components can be combined).

A means of fixing a flexible, fluid-bearing tube in a custom layout (a curving pattern) on the insulating layer. For example, the means of fixing is a castellated mat that is attached to the insulating layer (or these two components can be combined by molding castellations in the insulating layer). The castellations provide tube channels that have an omega cross-section: retaining the sheathed tube and allowing the tube to project above the castellations.

Held upon the insulating layer, a curving pattern of flexible, fluid-bearing tube with conductive sheath.

A heat-conducting surface fixed in thermal contact with the conductive exterior of the tube layout.

In the case of a solar thermal system, the conducting surface is a sun-facing heat collector that can be, for example, an aluminum plate that has a blackened face to improve heat absorption. Above the plate is an air gap and a transparent cover. Flexible tube such as PEX does not tend to rupture when water carried in the tube freezes. This means that water used for space heating can be directly circulated through the solar collector, avoiding the added cost, space requirement and thermal resistance of an intermediate heat exchanger.

If the radiant heat transfer system is fixed in the floor, then it must bear significant loads. In this case, a castellated mat or insulating layer can be used: the castellations can be flat-topped and able to support loads placed on the conducting layer. If the radiant system is fixed in the wall or the ceiling it may not bear significant loads. In this case, it is possible to fix the conducting layer to flat-topped castellations that are widely dispersed and which play no role in holding the tube layout. The sheathed tube can be held in a custom layout on the insulating layer by:
  cable ties;
  omega-shaped clips;
  omega-shaped guides;
  adhesive, for example, using peel-off adhesive pads;
  hook and loop strip.

As an example, a custom tube layout can be fixed rapidly using cable ties that are threaded through eyelets embedded in the insulating layer and round the tube. Standard cable ties would obstruct the thermal contact between tube and conducting layer. This effect can be mitigated by:
  making the ties of heat conducting material where the ties wrap round the tube;
  making the ties as thin as possible;
  using a thermal filler such as silicone sealant between tube and conducting layer.

As another example, the sheathed tube is fixed by clips with an omega cross-section. The clips can be fixed to the insulating layer in any location using adhesive, for example, peel-off adhesive, on a flat base. As an alternative the clips can have barbed stems or screw stems that can be inserted into the insulating layer or stems that snap into holes that form an array on the insulating layer.

As another example, the sheathed tube is fixed by rigid straight or curved guides with an omega cross-section, also fixed to the insulating layer by adhesive or by barbs.

The omega cross-section of the clips and guides leaves the upper surface of the tube free to press against the conducting layer.

The rigid conducting layer is a heat conducting plate or array of conducting plates. In an example, this layer is aluminum alloy. High-purity aluminum (greater than 99.6% pure) has a thermal conductivity (234 watts/m° C.) that is higher than any aluminum alloy but is weak (tensile strength 83 Mpa). If the design heat load requires only a thin conducting layer, high-purity aluminum may be:
  insufficiently rigid to apply effective pressure to the sheathed tube;
  vulnerable to damage during installation;
  unable to support weight where the plate is under-floor.

High-strength aluminum alloy (for example 2000 series or 7000 series alloys) has tensile strengths 4-5× higher than 99.6% pure aluminum but thermal conductivities can be 40% less. A possible compromise is a subset of 6000 series alloys that offers over twice the tensile strength of high purity aluminum for a reduction of 10-15% in thermal conductivity.

Alternatively, high-purity aluminum can be fixed to a reinforcing conducting layer. For example, the reinforcing layer can be high-strength aluminum alloy or steel (for example, A36 structural steel). High-purity aluminum sheet can be cold-welded to aluminum alloy sheet or to steel sheet by high pressure rolling. Steel with a hot-dipped layer of high-purity aluminum is available from multiple suppliers.

In another example, the rigid conducting layer is graphite foil backed by a reinforcing conducting layer. A commercially available graphite foil has an in-plane thermal conductivity (190 W/m° C.), comparable with aluminum alloys, and is also soft, so that compressive thermal contact with the tube is assisted. Graphite foils are also available with in-plane conductivities up 3× higher than pure aluminum. Currently such foils are expensive.

The rigid conducting layer can be fixed over the tube with compressive force by using an array of bolts that engage in sockets fixed in the insulating layer. The sockets can be anchored in the insulating layer by reinforcement, either embedded in the insulating layer or fixed to the back of the insulating layer. If a castellated insulating layer is used, the sockets can be embedded in the centres of the castellations.

If a castellated insulating layer is used, the conducting layer can be fixed by adhesive to the flat tops of the castellations. In this case, contact adhesive can be used and the conducting layer is pressed down, for example, by bolts, screws, by manual pressure, by the use of weights or by the use of clamps. The height of the castellations is slightly less than the height of the laid-out tube so that adhesive contact between the castellations and the conducting layer requires the sheathed tube to be deformed by compression.

Layouts Using Fixed Channels

The preceding section describes a radiant heat transfer system that allows any pattern or spacing of tube and that does not require careful pre-planning. Sheathed tube can also be used in fixed channels. For example:
  Channel-bearing insulating panels are fixed to a rigid substrate so that the channels link and form a continuous curving channel.
  Channel-bearing heat-conducting plates are fitted into the insulating panels. The channels have an omega cross-section.
  Sheathed tube is snapped into the channels in the plates.

In another example, channel-bearing insulated panels are manufactured with a continuous heat-conducting layer fixed (for example, by adhesive) to the panels on the channeled surface. A slit is cut through the conducting layer along the centre-line of each channel.

Then:
  The panels are fixed to a rigid substrate so that the slits link and form a continuous curving slit.
  Sheathed tube is pressed into the slit so that the conducting layer deforms around the tube and locks it into the channel. The deformation results in good thermal contact between the sheath and the conducting layer.

In current practice, the conducting layer is usually aluminum plate and this usually has only straight channels. This is because a curved channel is a compound curve that requires special pressing methods.

Because the sheathed tube does not require wrap-round contact with the inner surface of the channel, contact between tube and conducting layer can continue round all curves while avoiding compound curve pressing. In the example of the slit conducting layer, just described, the sheathed tube engages only with the deformed edge of the conducting layer.

Other Heat Transfer Applications

The described sheathed flexible tube can be used in a geothermal pond. For example:
- Channel-bearing metal plates are fixed to a frame to form an array of vertical panels with horizontal channels having an omega cross-section.
- Sheathed tube is snapped into the channels to form a continuous serpentine.
- The assembly of frame, panels and serpentine is floated on to the geothermal pond and sunk.

As an alternative, the sheathed flexible tube is wound with uniform gaps between turns on to metal pipe and the assembly is sunk in the pond.

The described sheathed flexible tube can be used in a geothermal trench or borehole. For example:
- Sheathed tube is snapped into channels in a series of metal plates.
- The tube and plates are inserted into a trench.

DETAILED DESCRIPTION

Summary of Figures

The figures shown are schematic and not to scale.

DETAILED DESCRIPTION

Figure 1A:
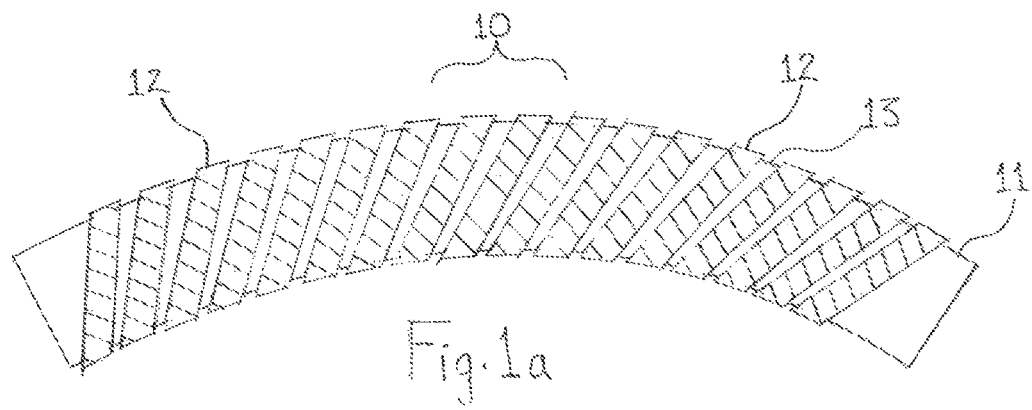
FIG. 1a: flexible tube sheathed by a spiral strip.

FIG. 1a: Flexible Tube Sheathed by a Spiral Strip.

FIG. 1a is a side view of a sheathed tube (10) comprising a flexible fluid-bearing tube (11) with a flexible heat-conducting sheath that is a spiral strip (12), tightly wrapped round the tube (11). The spiral strip (12) can be a wire or a tape and is made of heat conducting material. The material has a thermal conductivity greater than 15 W/m° C. and is preferably easily deformed (ie malleable and ductile). In an example, a suitable deformable heat-conducting material is high purity aluminum. The spirals (12) of the sheath are separated by uniform gaps (13) that permit bending of the sheathed tube (10).

Figure 1B:
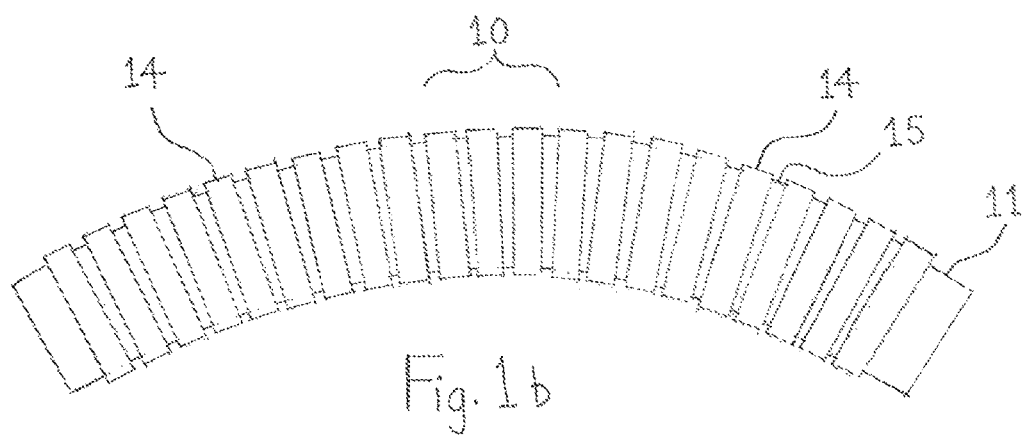
FIG. 1b: flexible tube sheathed by a series of rings.

FIG. 1b: Flexible Tube Sheathed by a Series of Rings.

FIG. 1a is a side view of a sheathed tube (10) comprising a flexible fluid-bearing tube (11) with a flexible heat-conducting sheath that is a series of rings (14) tightly wrapped round the tube (11). The rings (14) can be wire or strip or tape and are made of heat conducting material. The material has a thermal conductivity greater than 15 W/m° C. and is preferably easily deformed (ie malleable and ductile). In an example, a suitable deformable heat-conducting material is high purity aluminum. The rings (14) are separated by uniform gaps (15) that permit bending of the sheathed tube (10).

Figure 1C:
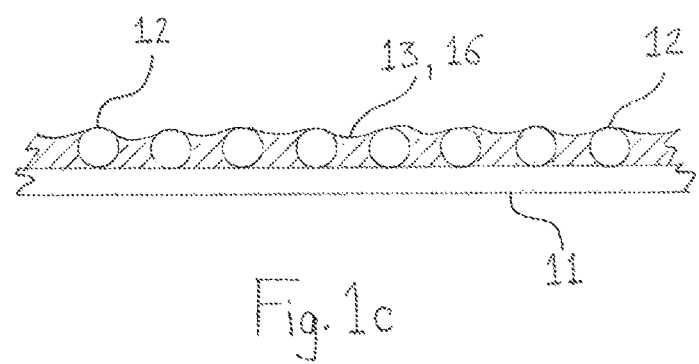
FIG. 1c: detail of bonding agent applied to the sheath.

FIG. 1c: Detail of Bonding Agent Applied to the Sheath.

FIG. 1c is a cross-section in side view of one wall of the sheathed tube (10). Pressed against the fluid-bearing tube (11) is a series of spiral wires (12) separated by uniform gaps (13). Fixed in the gaps (13) is a layer of flexible adhesive (16). The adhesive (16) can be applied as follows:
- The spiral wire (12) is wound tightly around the tube (11).
- The adhesive (16) is painted on to the spiral (12) and then wiped off, using a motion at right angles to the spiral (12), so leaving adhesive in the gaps (13)

Figure 2A:
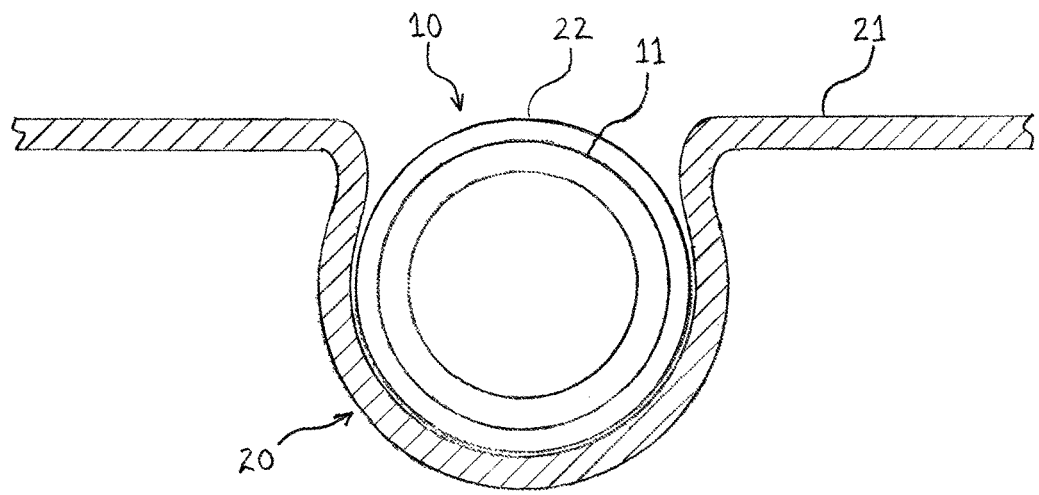
FIG. 2a: flexible sheathed tube inside an omega-shaped channel in a conducting surface.

FIG. 2a: Flexible Sheathed Tube Inside an Omega-Shaped Channel in a Conducting Surface.

FIG. 2a shows the cross-section of a flexible sheathed tube (10) installed in the omega-shaped channel (20) of a heat diffusing/collecting plate (21). The sheathed tube (10) comprises a flexible, fluid-bearing tube (11) with a flexible, heat-conducting outer sheath (22). The sheath (22) is tightly fitted to the outer surface of the tube (11) and fixed to the tube (11) using a layer of flexible adhesive (not shown). The sheath (22) provides a thermal path between the entire outer surface of the tube (11) and the plate (21).

Thermal contact resistance between sheath (22) and channel (20) is reduced by:
- Ensuring a tight fit of tube (11) and sheath (22) in the channel (20). A tight fit is enabled by using a sheath (22) of deformable material. For example, high purity aluminum and graphite foil are both easily deformed.
- Using a sheath (22) of deformable material and so enabling the outer surface of the sheath (22) to conform to the inner surface of the channel (20).
- Using a sheath (22) of high thermal conductivity and so providing a thermal bypass around air gaps between the sheath (22) and the inner surface of the channel (20).

An array (not shown) of plates (21) with channels (20) can support a desired curved pattern of flexible sheathed tube (10).

Figure 2B:
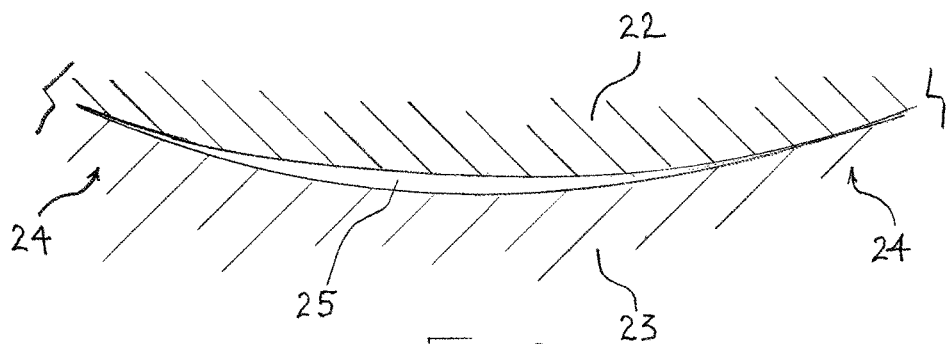
FIG. 2b: thermal bypass formed by the sheath.

FIG. 2b: Thermal Bypass Formed by the Sheath.

FIG. 2b shows a cross-section of the interface between a portion of the sheath (22) and an adjacent portion of a heat-conducting surface (23) such as the inner surface of the groove (20: see FIG. 2a). Good thermal contact between sheath (22) and surface (23) is shown at two zones (24) with an air gap (25) in between the zones (24). The sheath (22) provides a thermal bypass around the gap (25)

Figure 3A:
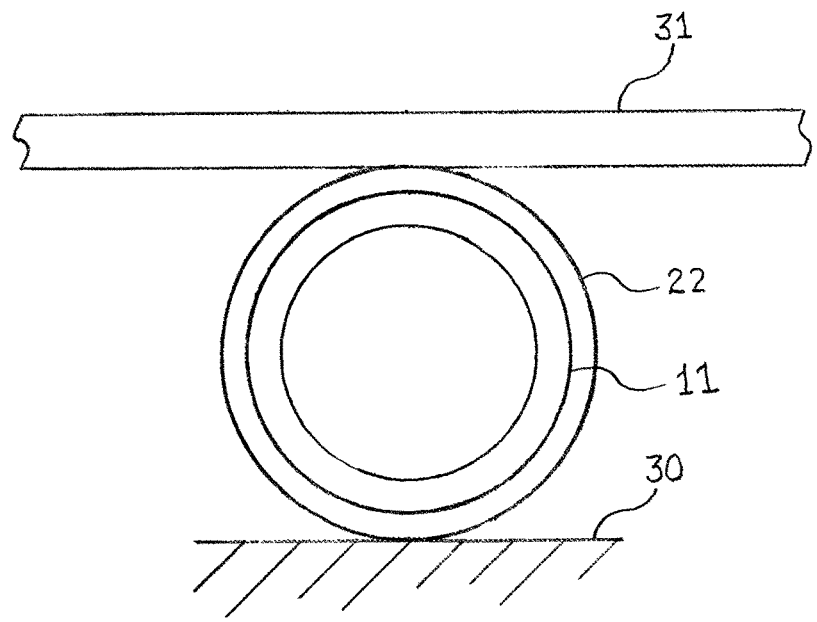
FIG. 3a: sheathed tube with malleable sheath in non-compressive contact with a conducting surface.

FIG. 3a: Sheathed Tube with Malleable Sheath in Non-Compressive Contact with a Conducting Surface.

FIG. 3a shows a cross-section of a flexible fluid-bearing tube (11) with sheath (22) in contact with a rigid planar insulating surface (30) and a rigid planar heat-conducting surface (31). The contact is non-compressive so that the contact area between sheath (22) and conducting surface (31) is small. The thermal contact resistance is significant.

Figure 3B:
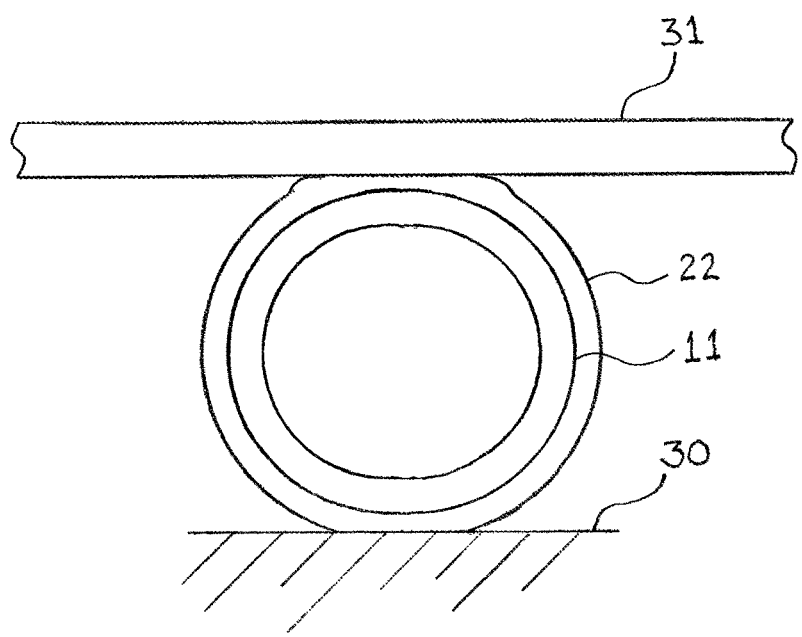
FIG. 3b: sheathed tube with malleable sheath in compressive contact with a conducting surface.

FIG. 3b: Sheathed Tube with Malleable Sheath in Compressive Contact with a Conducting Surface.

FIG. 3b shows a cross-section of a flexible fluid-bearing tube (11) with flexible heat-conducting sheath (22) in contact with a rigid planar insulating surface (30) and a rigid planar heat-conducting surface (31). The contact is compressive and in this instance, the sheath (22) is made of malleable material. The tube (11) and sheath (22) distort and the sheath (22) deforms, so that the contact area is increased; also the thermal contact resistance is reduced.

Compressive contact can be achieved by a variety of means (not shown) that pull or push the rigid planar surfaces (30, 31) towards each other and hold these surfaces (30,31) in position.

In an instance of the present invention, the contact between sheath (22) and heat-conducting surface (31) is sufficiently compressive to cause distortion of the tube (11) and deformation of the sheath (22), whereby overall thermal resistance is reduced.

Figure 4A:
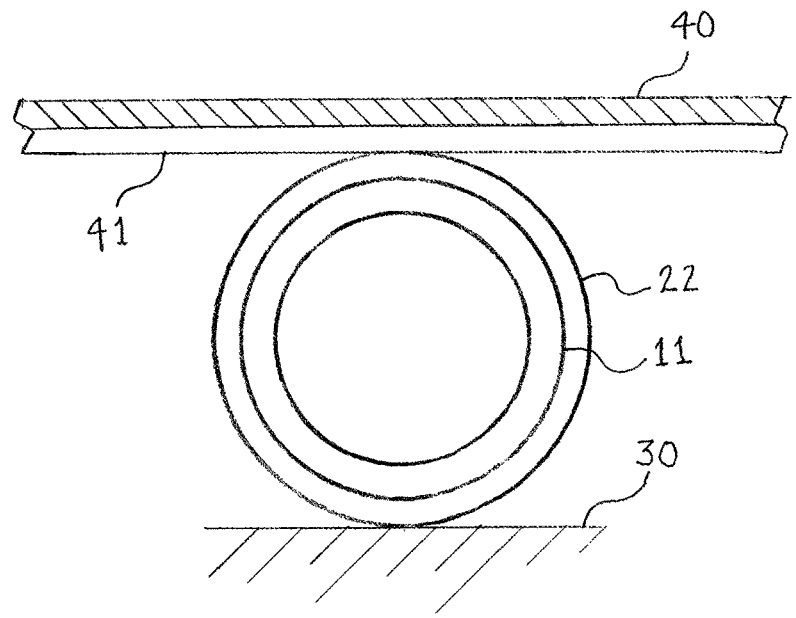
FIG. 4a: sheathed tube in non-compressive contact with a conducting surface with malleable layer.

FIG. 4a: Sheathed Tube in Non-Compressive Contact with a Conducting Surface with Malleable Layer.

FIG. 4a shows a cross-section of a flexible fluid-bearing tube (11) with sheath (22) in contact with a rigid planar insulating surface (30) and a rigid planar heat-conducting surface comprising two layers: a rigid layer (40) and a malleable layer (41). The contact is non-compressive so that the contact area is small. The thermal contact resistance is significant.

Figure 4B:
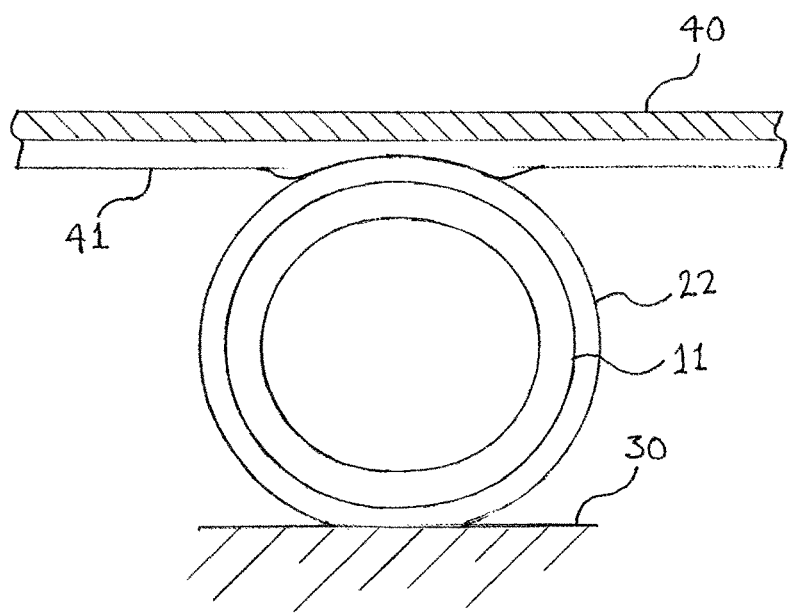
FIG. 4b: sheathed tube in compressive contact with a conducting surface with malleable layer.

FIG. 4b: Sheathed Tube in Compressive Contact with a Conducting Surface with Malleable Layer.

FIG. 4b shows a cross-section of a flexible fluid-bearing tube (11) with sheath (22) in contact with a rigid planar insulating surface (30) and a rigid planar heat-conducting surface comprising two layers: a rigid layer (40) and a malleable layer (41). The contact is compressive. The tube (11) and sheath (22) distort and the malleable layer (41) deforms, so that the contact area is increased; also the thermal contact resistance is reduced.

In an instance of the present invention, the contact between sheath (22) and heat-conducting surface (22) is sufficiently compressive to cause distortion of the tube (11) and deformation of a malleable layer (41) in the heat-conducting surface (30), whereby overall thermal resistance is reduced.

Figure 5A:
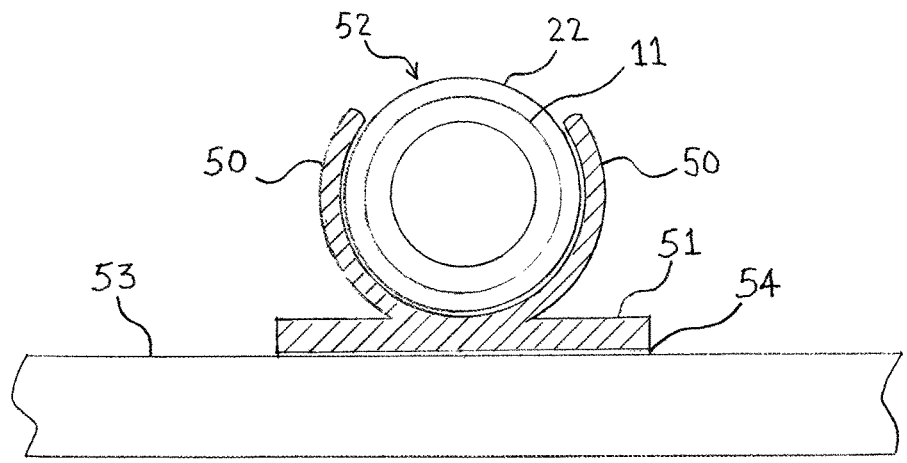
FIG. 5a: sheathed tube in an omega-shaped clip with adhesive base.

FIG. 5a: Sheathed Tube in Omega-Shaped Clip with Adhesive Base.

FIG. 5a shows a cross-section of a flexible fluid-bearing tube (11) with flexible heat-conducting sheath (22). The sheath (22) is held in an omega-shaped channel formed by a clip (50) fixed to a flat base (51). A portion (52) of the tube (11) and the sheath (22) projects above the clip (50). The flat base (51) is attached to a rigid substrate (53) by an adhesive layer (54). The substrate (53) can be an insulating layer. For convenience, the adhesive layer (54) is a peel-off contact adhesive.

Figure 5B:
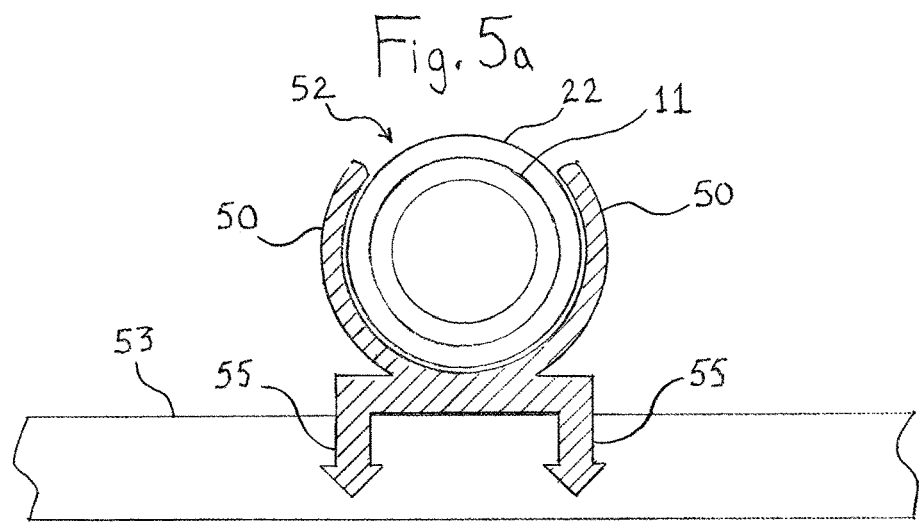
FIG. 5b: sheathed tube in an omega-shaped clip with barbed base.

FIG. 5b: Sheathed Tube in Omega-Shaped Clip with Barbed Base.

FIG. 5b shows a cross-section of a flexible fluid-bearing tube (11) with flexible heat-conducting sheath (22). The sheath (22) is held in an omega-shaped channel formed by a clip (50) fixed to a base with barbs (55). A portion (52) of the tube (11) and the sheath (22) projects above the clip (50). The barbs (55) are inserted into a rigid substrate (53).

Figure 5C:
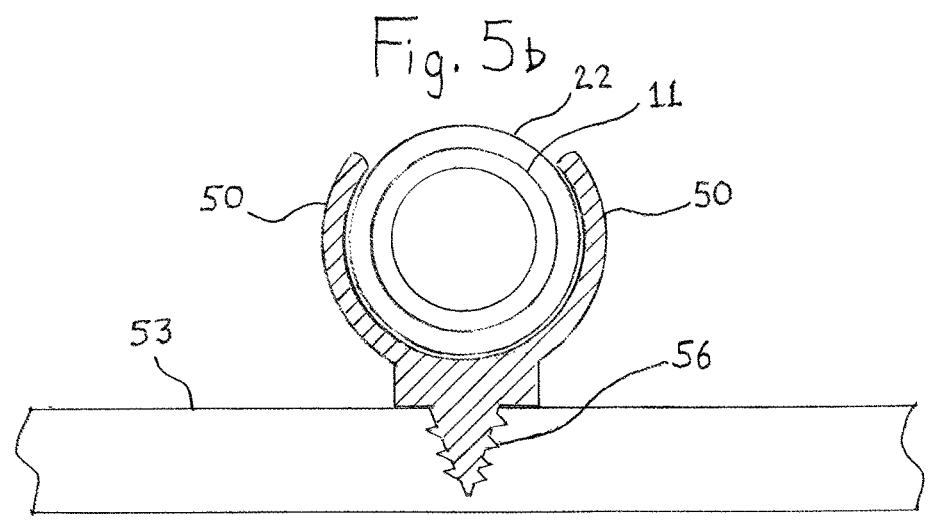
FIG. 5c: sheathed tube in an omega-shaped clip with screw-in base.

FIG. 5c: Sheathed Tube in Omega-Shaped Clip with Screw-in Base.

FIG. 5c shows a cross-section of a flexible fluid-bearing tube (11) with flexible heat-conducting sheath (22). The sheath (22) is held in an omega-shaped channel formed by a clip (50) fixed to a base with a screw (56). A portion (52) of the tube (11) and the sheath (22) projects above the clip (50). The screw (56) is inserted into a rigid substrate (53).

In an instance of the present invention, clips (50) as described in FIGS. 5a, 5b and 5c can be fixed on a suitable rigid substrate (53) so as to support a sheathed tube in a desired curved pattern.

The clips (50) shown in FIGS. 5a, 5b, 5c can be made of a moldable polymer such as polypropylene.

In each case, the sheath (22) projects above the clips (50) so that a conducting surface (not shown) can be pressed down on the sheath (22). The clips (50) cannot support a significant load so that other load-bearing means (not shown) are required. For example, castellations can be used (see FIGS. 8a, 8b).

Clips are widely used to pin down flexible tube in radiant heating but the conventional clips differ from those shown in FIGS. 5a, 5b, 5c:

Self-adhesive P-clips have a snap-in fit from the side rather than the top.

Self-adhesive PEX grip rails have upper retaining barbs and the tube when inserted in the rail is completely below the level of the barbs.

Barbed PEX clips have a hoop shape ie the clip passes over the tube and acts as a staple.

PEX screw clips and so-called Quips (for attaching PEX tube to a wire grid) have upper retaining barbs so that the tube when inserted in the clip is completely below the level of the barbs.

Figure 6A:
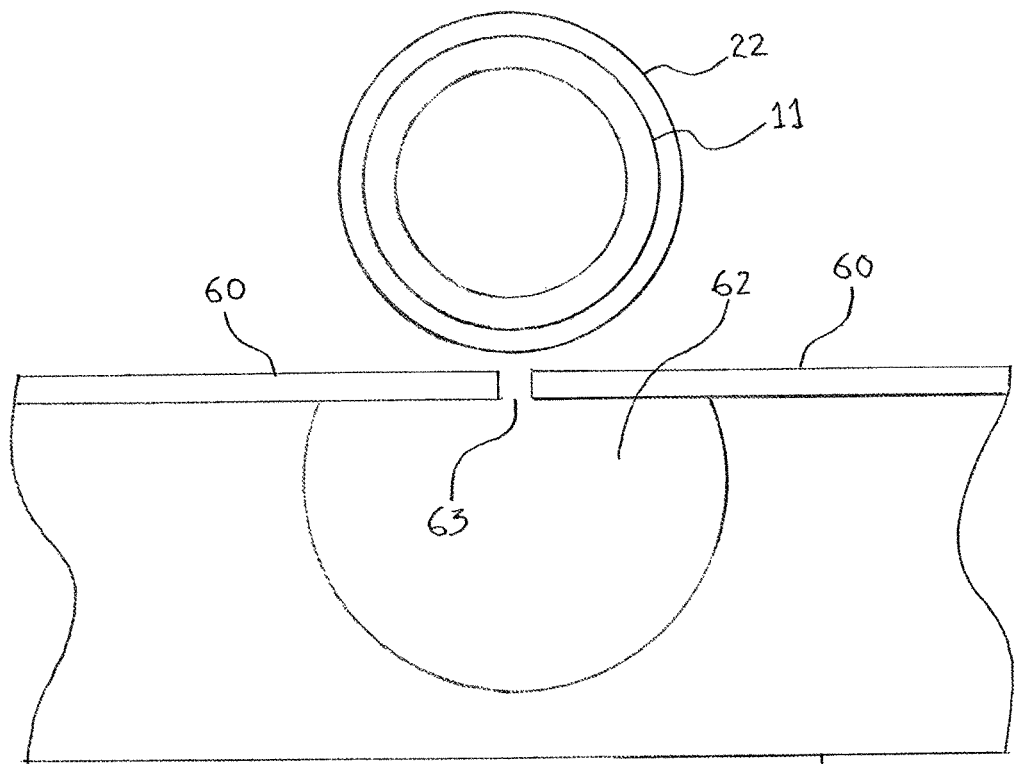
FIG. 6a: sheathed tube over a u-shaped channel with slotted conducting layer.

FIG. 6a: Sheathed Tube Over u-Shaped Channel with Slotted Conducting Layer.

FIG. 6a shows a cross-section of a flexible fluid-bearing tube (11) with flexible heat-conducting sheath (22). Below the tube (11) with sheath (22) is shown in cross-section a deformable heat-conducting layer (60) fixed to a rigid planar substrate (61). The conducting layer (60) covers a u-shaped channel (62) in the substrate (61). Penetrating the conducting layer (60) is a slit (63) that is centred over the u-shaped channel (62) and runs parallel with the channel (62).

Figure 6B:
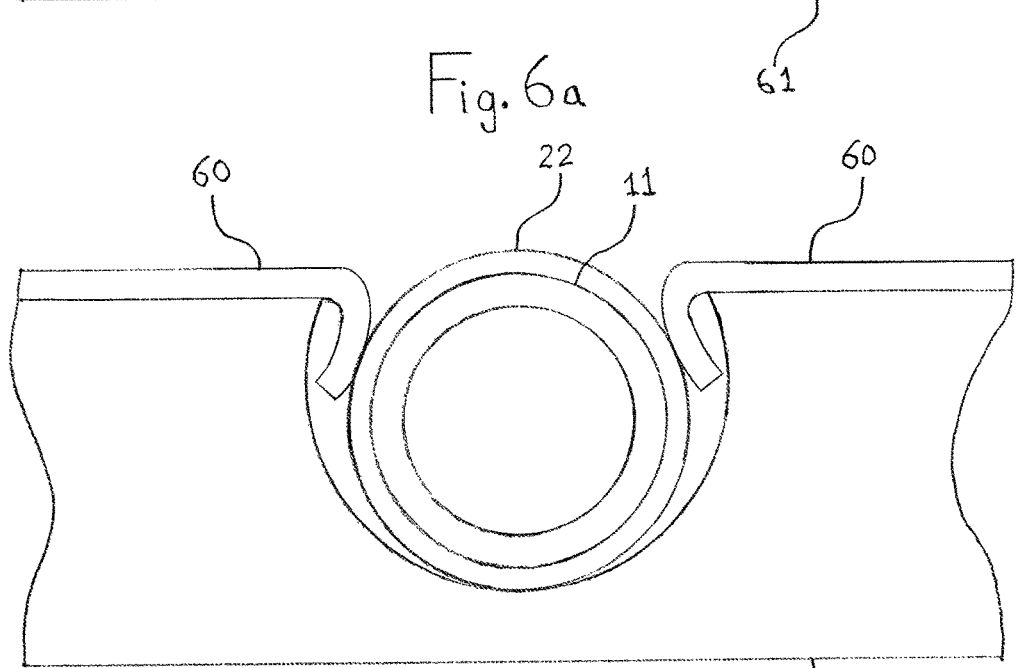
FIG. 6b: sheathed tube in u-shaped channel held by bent conducting layer.

FIG. 6b: Sheathed Tube in u-Shaped Channel Held by a Bent Conducting Layer.

FIG. 6b shows a cross-section of a flexible fluid-bearing tube (11) with flexible heat-conducting sheath (22) after the tube (11) with sheath (22) has been pressed down on the slit (63: see FIG. 6a) above the u-shaped channel (62). On each side of the channel (62) the heat-conducting layer (60) has been bent back.

As a result of the mechanical resistance to bending of the conducting layer (60), the sheath (22) is held firmly in the channel (62) and the thermal contact resistance between sheath (22) and conducting layer (60) is low.

An array of panels (not shown) with u-shaped channels (62) and an attached conducting layer (60) with slits (63) can support a desired curved pattern of sheathed tube (10).

The slit (63) can be substituted by another form of puncturing of the conducting layer (60): for example, a line of closely spaced perforations (not shown).

Figure 7A:
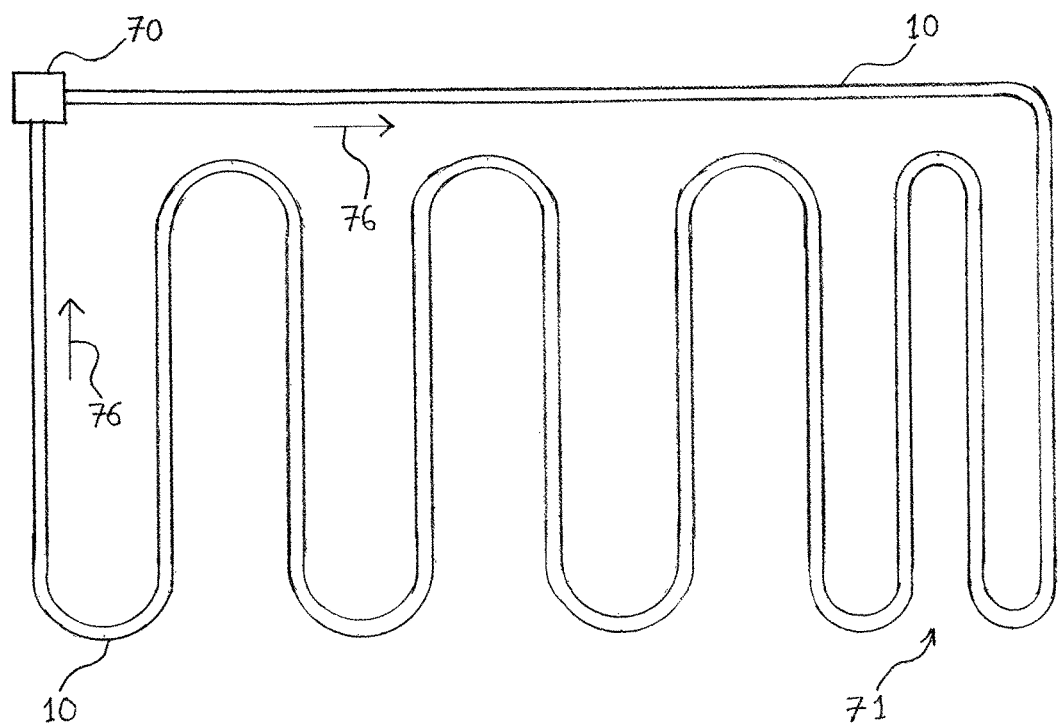
FIG. 7a: serpentine tube layout for radiant heat transfer.

FIG. 7a: Serpentine Tube Layout for Radiant Heat Transfer.

FIG. 7a shows in plan view an example of a simple serpentine layout of a flexible fluid-bearing sheathed tube (10) for radiant under-floor heating. The tube (10) conducts hot heat transfer fluid from a manifold (70) to a zone requiring higher heat transfer rates (71) such as a zone adjacent to a large exterior window. This zone (71) requires closer spacing of the sheathed tube (10). The tube (10) continues with wider spacing and returns to the manifold (70). The direction of fluid flow (76) is shown by arrows. In an example, the heat transfer fluid is water.

Means of fixing the sheathed tube (10) in a desired layout are not shown but are described under FIGS. 2, 5, 6 and 8.

Figure 7B:
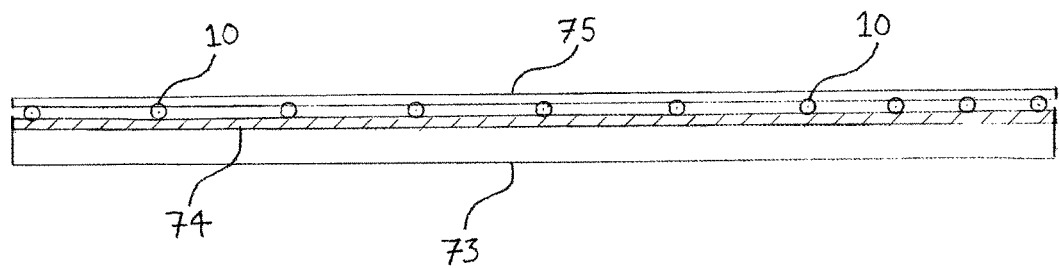
FIG. 7b: layers of radiant heat transfer system.

FIG. 7b: Layers of Radiant Heat Transfer System.

FIG. 7b shows in cross-section the possible layers of a radiant under-floor heating system. The lowest layer is a rigid planar substrate (73) that can be a subfloor. Fixed to the substrate (73) is an insulating layer (74). Fixed to the insulating layer is the sheathed tube (10) laid out in a curved pattern. Fixed to the top of the sheathed tube (10) is a rigid planar heat-conducting surface (75).

Other layers (not shown) can be placed on the conducting surface (75): such layers can include ceramic tile, engineered wood plank, carpet and so on.

Means of fixing the sheathed tube (10) in a desired layout are not shown but are described under FIGS. 2, 5, 6 and 8.

Figure 8A:
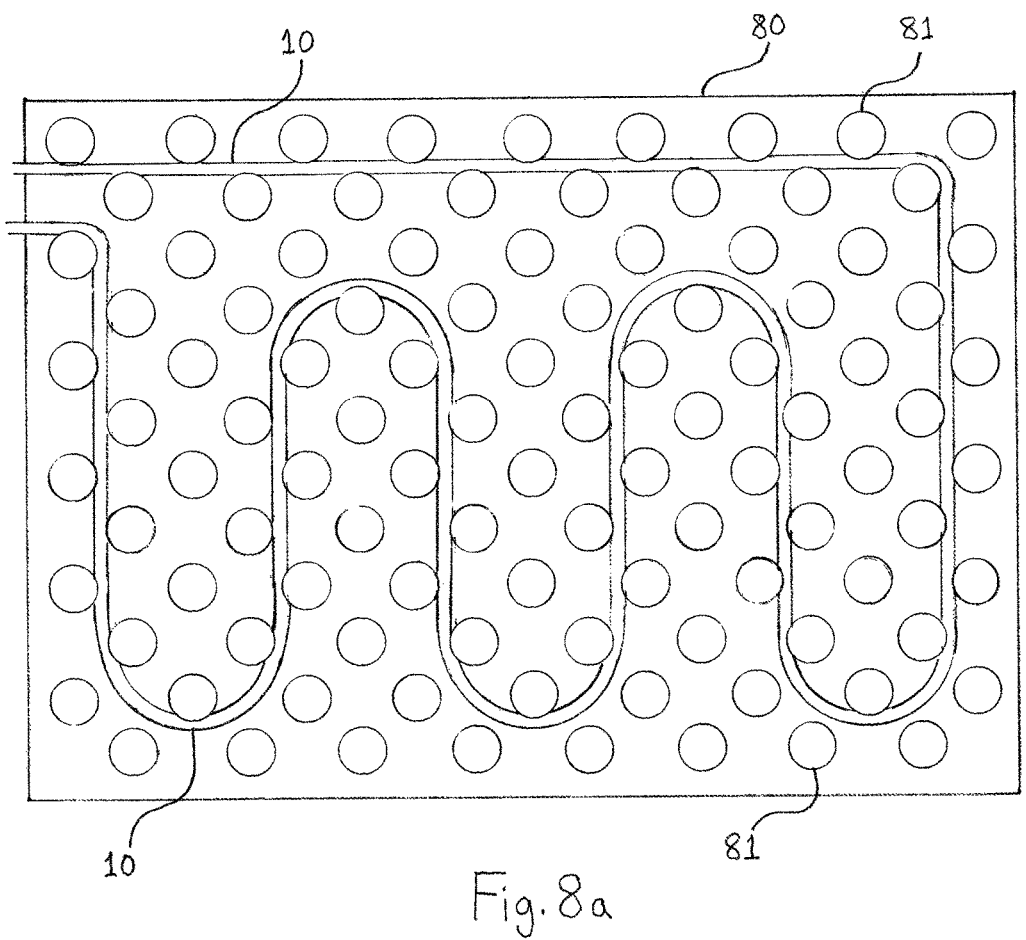
FIG. 8a: serpentine tube layout using a castellated surface.

FIG. 8a: Serpentine Tube Layout Using a Castellated Surface.

FIG. 8a shows in plan view a flexible sheathed tube (10) in an example of a serpentine layout on a rigid planar castellated surface (80). The castellations (81) are rigid protrusions arranged in a uniform grid. By weaving the tube (10) between castellations (81) the tube (10) can be fixed in a desired curving pattern.

The geometry of the castellated surface (80) enables the sheathed tube (10) to be securely gripped and at the same time, a portion of the sheathed tube (10) projects above the castellations (81).

Figure 8B:
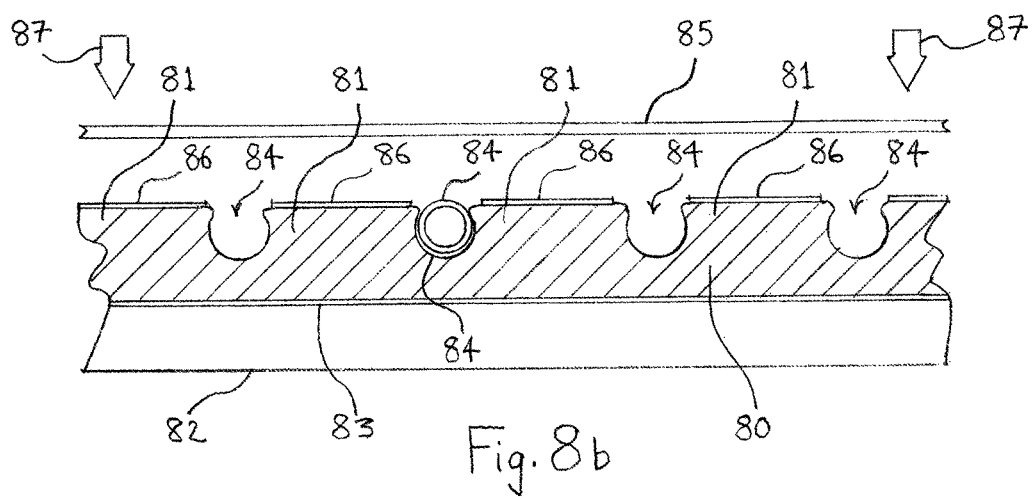
FIG. 8b: layers of radiant heat transfer system using a castellated surface.

FIG. 8b: Layers of Radiant Heat Transfer System Using a Castellated Surface.

FIG. 8b shows in cross-section the possible layers of a radiant heat transfer system using a castellated surface (80). The first layer is a rigid substrate (82). For example, in the case of an under-floor heating or cooling system, the substrate (82) can be a subfloor. In the case of a wall-mounted heat transfer system, the substrate (82) can be wall-panels. In the case of a ceiling-mounted heat transfer system the substrate (82) can be panels on a suspended frame.

Fixed to the substrate (82) by an adhesive layer (83) is a layer with a castellated surface (80) that can comprise rigid insulation into which a uniform grid of castellations (81) is molded. In an example, the castellated layer (80) is rigid polyurethane foam. The castellations (81) have flat tops and concave faces and provide channels (84) that can retain the sheathed tube (10) in a desired curved pattern. The dimensions of the channels (84) ensure that a portion of the sheathed tube (10) projects above the castellations (81). Shown above the castellated layer (80) is a rigid heat-conducting layer (85) that is pressed against an adhesive layer (86) on the flat tops of the castellations (81). When the conducting layer (85) is pressed against the adhesive layer (86) in the direction shown (87), the conducting layer (85) is in compressive contact with the sheathed tube (10), meaning that the sheathed tube (10) distorts and the sheath (22: see FIG. 3b) deforms sufficiently to significantly reduce thermal resistance between the heat transfer fluid carried in the sheathed tube (10) and the conducting layer (85).

The adhesive layer (86) can be peel-off contact adhesive.

Instead of, or in addition to, the adhesive layer (86), bolts or screws (not shown) can be used to fix the conducting layer (85) to the castellated surface (84) with compressive contact between the conducting layer (85) and the sheathed tube (10).

Figure 9A:
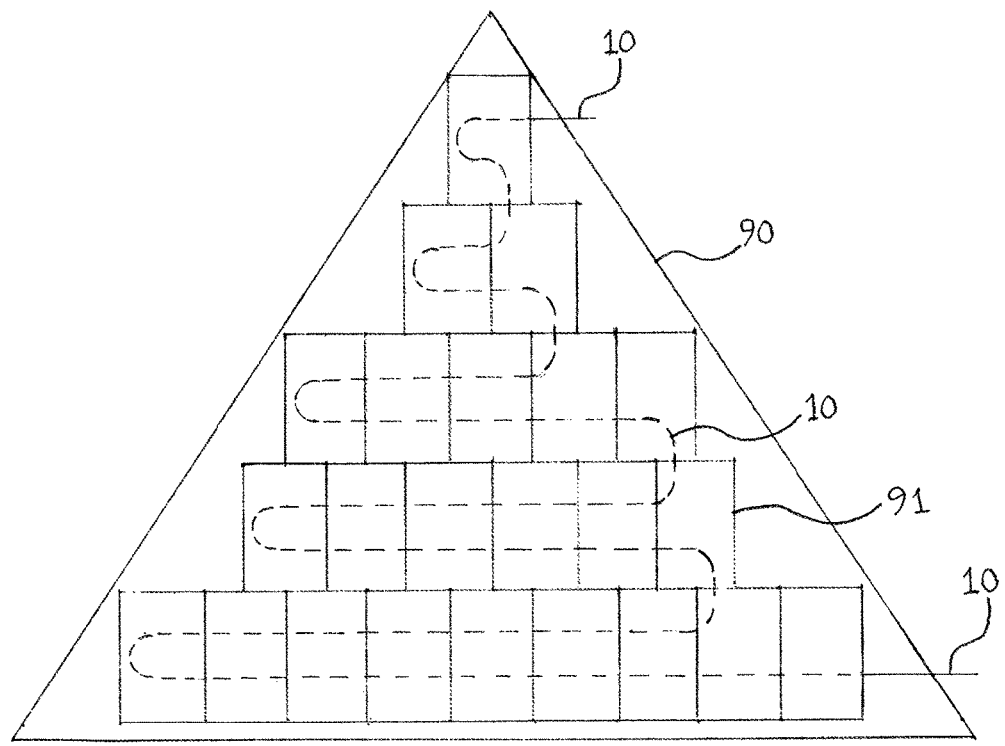
FIG. 9a: roof-mounted panels and layout for solar heating.

FIG. 9a: Roof-Mounted Panels and Layout for Solar Heating.

This figure gives a plan view of a hipped roof (90) and an array of solar panels of standard size (91). Indicated by a dotted line is an example of an underlying simple serpentine of sheathed tube (10). Water or water with anti-freeze agent, or other heat-transfer fluid, is circulated through the serpentine.

By using panels of moderate size that are installed one by one:
  One-man installation is made possible.
  The geometry of the roof can be matched. Sufficiently small panels (91) allow a system to be built round dormer windows and chimneys.

Figure 9B:
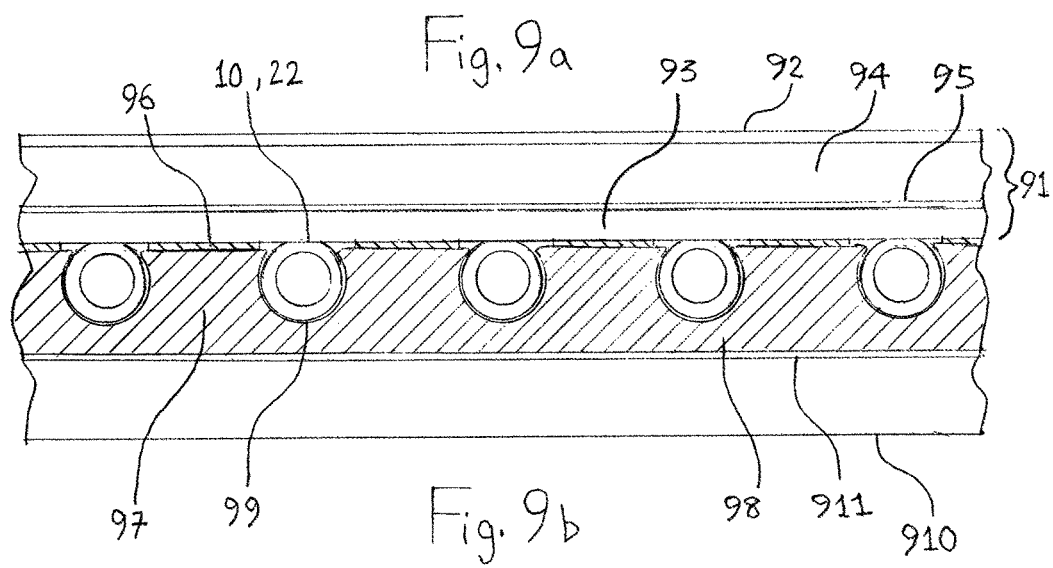
FIG. 9b: layers of solar heating system.

FIG. 9b: Layers of Solar Heating System.

This figure shows a cross-section of a portion of the system shown in FIG. 9a.

The top layer of each panel (91) is a transparent sheet (92) that is, for example, glass or acrylic. This sheet (92) is separated from a planar, rigid, heat-conducting surface (93) by an air gap (94). The top layer (95) of the conducting surface (93) is coloured black to aid absorption of heat. In an example, the conducting surface (93) is aluminum plate and the top layer (95) is anodized.

The transparent layer (92) and conducting layer (93) of each panel (91) are held together along the edges by a rectangular frame (not shown). The frames can be linked, for example, by tongue and groove edges (not shown) so that panels (91) can be linked into a continuous array.

The underside of the conducting surface (93) is fixed by a layer of adhesive (96) to the flat tops of castellations (97) in a castellated surface (98). The conducting surface is in compressive contact with sheathed tube (10): shown here with deformation of the sheath (22). Conveniently, the adhesive (96) can be peel-off contact adhesive. The sheathed tube (10) is held in channels (99) between the castellations (97). The castellated surface (98) is fastened to an insulating layer (910) by a layer of adhesive (911).

A method for fixing the panels (91) to a roof (90) in a customized layout of flexible sheathed tube (10) is as follows:
  Install fixing devices (not shown) on the roof (90): for example, using hooks that run under tiles and that can be fixed to the interior roof beams. Mount external rails on the hooks.
  Attach rigid panels with an insulating layer (910) to the rails (not shown). The panels can have castellated surfaces (98) attached to or molded into the insulating layer (910).
  Snap flexible sheathed tube (10) into the channels (99) in the castellated surface (98) in the desired pattern. The sheathed tube (10) projects slightly above the castellations (97).
  Peel off the protective layer (not shown) on the flat tops of the castellations (97) to expose a contact adhesive layer (96). Install the solar panels (91) by pressing down the rigid conducting surface (93) on the adhesive layer (96), so that the conducting surface (93) is in compressive contact with the sheathed tube (10).
  Place flexible water-proof grout between panels. Attach water-proof side strips to the outer edges of the array of panels. (These finishing steps are not shown). The result is a sealed, customized solar heat collector.

The invention claimed is:

1. A sheathed flexible conduit configured for use in heat transfer applications requiring custom in-situ manual layout comprising:

a flexible tube of plastic or plastic composite material arranged to conduct a heat transfer fluid, said tube having a uniform wall thickness and smooth inner and outer surfaces;

a sheath of material with thermal conductivity greater than 15 W/m° C. surrounding said outer surface of said flexible tube, said sheath contiguous with said outer surface of said flexible tube;

said sheath being composed of a soft and malleable material that allows said sheath to be deformed in the course of said custom in-situ manual layout;

said deformation being bending and spreading and thinning and conforming to an adjacent surface;

said sheathed flexible conduit being arranged in a curved pattern and held in said curved pattern by fixing means;

said sheathed flexible conduit having an outer surface fixed in thermally conductive contact with at least one contiguous heat-conducting surface having a thermal conductivity greater than 15 W/m° C.;

said thermally conductive contact being made under pressure by means of compressive fastening, whereby said flexible tube and said sheath distort against said contiguous heat-conducting surface and said sheath deforms against said contiguous heat-conducting surface by bending, spreading and thinning, so increasing heat transfer area and conforms to said contiguous heat-conducting surface, so reducing thermal contact resistance;

said compressive fastening creating a thermal conductive path from all of the circumference of said flexible tube to said contiguous heat-conducting surface;

said compressive fastening being formed in the course of said custom in-situ manual layout;

said flexible tube having a longitudinal axis and said sheath comprising segments transverse to said longitudinal axis of said flexible tube and, when said sheathed flexible conduit is held straight, having spaces of uniform width between said segments of said sheath that are adjacent;

said uniform spaces being completely filled with a flexible adhesive;

said segments, in the absence of compressive deformation of said segments, having a uniform radial thickness and a uniform axial thickness;

said sheathed flexible conduit being as flexible as said flexible tube alone at a coverage exceeding 95% of said exterior surface of said flexible tube by said sheath;

said sheathed flexible conduit having a ratio of minimum bend radius to outer diameter of said flexible tube less than 10;

said sheathed flexible conduit having a modulus of elasticity of 2 GPa or less.

2. The sheathed flexible conduit as claimed in claim 1 wherein said flexible tube has at least one layer of cross-linked, high-density polythene.

3. The sheathed flexible conduit as claimed in claim 1 wherein said sheath is a spiral strip enclosing said flexible tube and said adjacent segments are adjacent spirals of said spiral strip.

4. The sheathed flexible conduit as claimed in claim 1 wherein said sheath is a series of rings enclosing said flexible tube and each contiguous with said outer surface of said flexible tube and said adjacent segments are adjacent rings in said series of rings.

5. The sheathed flexible conduit as claimed in claim 1 wherein said sheath is composed of aluminum of at least 99.5% purity.

6. The sheathed flexible conduit as claimed in claim 1 wherein said heat transfer fluid is water.

7. The sheathed flexible conduit as claimed in claim 1 wherein said sheathed flexible conduit has a circular cross-section transverse to said longitudinal axis and said fixing means is a plurality of channels in a rigid surface where such channels have an inner radius matching the outer radius of said sheathed flexible conduit whereby said sheathed flexible conduit is gripped in said channels.

8. The sheathed flexible conduit as claimed in claim 1 wherein said fixing means is a deformable and heat-conducting layer fixed over a plurality of channels in a rigid surface and said deformable and heat-conducting layer is punctured along a center line of said channels, whereby by pressing said sheathed flexible conduit into said center line, said sheathed flexible conduit is gripped by bent edges of said deformable and heat-conducting layer and said gripping comprises said compressive fastening.

9. The sheathed flexible conduit as claimed in claim 1 wherein said fixing means is a rigid surface comprising a uniformly spaced array of castellations, channels being between said castellations, and the width of said channels matching a portion of the outer circumference of said sheathed flexible conduit, whereby said sheathed flexible conduit is gripped in said channels and projects above said castellations enabling thermally conductive contact between said sheath and said heat-conducting surface adjacent to said castellations; said thermal conductive contact being maintained by said means of compressive fastening, pressing said sheath and said adjacent heat-conducting surface together.

10. The sheathed flexible conduit as claimed in claim 1 wherein said fixing means is an array of omega-shaped clips attached to a rigid substrate and arranged so that said flexible sheathed conduit is gripped by said omega-shaped clips and projects above said omega-shaped clips, whereby said heat-conducting surface is pressed upon said sheath by said means of compressive fastening.

11. The sheathed flexible conduit as claimed in claim 1 wherein said heat-conducting surface has a deformable heat-conducting facing adjacent to said sheath and said sheath and said heat-conducting surface are held together by said means of compressive fastening, whereby said tube and said sheath distort against said heat-conducting surface and said heat-conducting facing deforms by spreading and thinning against said sheath, so increasing heat transfer area and reducing thermal contact resistance.

12. The sheathed flexible conduit as claimed in claim 9 wherein said means of compressive fastening is an adhesive layer between said heat-conducting surface and said castellations.

13. The sheathed flexible conduit as claimed in claim 9 wherein said means of compressive fastening is an array of threaded fasteners connecting said heat-conducting surface to said castellations.

14. A method of installing a heat transfer apparatus comprising:

manually laying out in-situ a sheathed flexible conduit comprising:

a flexible tube of plastic or plastic composite material arranged to conduct a heat transfer fluid, said tube having a uniform wall thickness and smooth inner and outer surfaces;

a sheath of material with thermal conductivity greater than 15 W/m° C. surrounding said outer surface of said flexible tube, said sheath contiguous with said outer surface of said flexible tube;

said sheath being composed of a soft and malleable material that allows said sheath to be deformed in the course of said custom in-situ manual layout;

said deformation being bending and spreading and thinning and conforming to an adjacent surface;

said flexible tube having a longitudinal axis and said sheath comprising segments transverse to said longitudinal axis of said flexible tube and, when said sheathed flexible conduit is held straight, having spaces of uniform width between said segments of said sheath that are adjacent;

said uniform spaces being completely filled with a flexible adhesive;

said segments, in the absence of compressive deformation of said segments, having a uniform radial thickness and a uniform axial thickness;

said sheathed flexible conduit having a ratio of minimum bend radius to outer diameter of said flexible tube less than 10;

said sheathed flexible conduit having a modulus of elasticity of 2 GPa or less;

arranging said sheathed flexible conduit in a curved pattern;

holding said sheathed flexible conduit in said curved pattern by fixing means;

fixing an outer surface of said sheathed flexible conduit in thermally conductive contact with at least one contiguous heat-conducting surface having a thermal conductivity greater than 15 W/m° C.;

providing, by means of said sheath, a thermal conductive path from all of the circumference of said flexible tube to said contiguous heat-conducting surface;

said thermally conductive contact being made under pressure by means of compressive fastening, whereby said flexible tube and said sheath distort against said contiguous heat-conducting surface and said sheath deforms against said contiguous heat-conducting surface by bending, spreading and thinning so increasing heat transfer area and by conforming to said contiguous heat-conducting surface, so reducing thermal contact resistance;

creating by said compressive fastening a thermal conductive path from all of the circumference of said flexible tube to said contiguous heat-conducting surface.

* * * * *